United States Patent
Fukushima et al.

(10) Patent No.: US 9,721,519 B2
(45) Date of Patent: Aug. 1, 2017

(54) DISPLAY DEVICE AND ELECTRONIC DEVICE

(71) Applicant: Japan Display Inc., Minato-ku (JP)

(72) Inventors: Toshiaki Fukushima, Minato-ku (JP); Hayato Kurasawa, Minato-ku (JP); Hiroshi Mizuhashi, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 277 days.

(21) Appl. No.: 14/690,659

(22) Filed: Apr. 20, 2015

(65) Prior Publication Data

US 2015/0310792 A1    Oct. 29, 2015

(30) Foreign Application Priority Data

Apr. 23, 2014    (JP) .................................. 2014-089254

(51) Int. Cl.
    *G09G 3/36*    (2006.01)
(52) U.S. Cl.
    CPC ......... *G09G 3/3648* (2013.01); *G09G 3/3614* (2013.01); *G09G 2300/0426* (2013.01); *G09G 2310/0297* (2013.01); *G09G 2320/0209* (2013.01); *G09G 2320/0219* (2013.01); *G09G 2320/0223* (2013.01); *G09G 2320/0233* (2013.01)
(58) Field of Classification Search
    CPC ............... G09G 3/3648; G09G 3/3614; G09G 2300/0426; G09G 2310/0297; G09G 2320/0209; G09G 2320/0219; G09G 2320/0223; G09G 2320/0233
    See application file for complete search history.

(56) References Cited

U.S. PATENT DOCUMENTS

| | | | | |
|---|---|---|---|---|
| 8,054,428 B2 * | 11/2011 | Song | .................. | G02F 1/133371 349/114 |
| 2009/0174692 A1 * | 7/2009 | Park | ..................... | G09G 3/3648 345/204 |
| 2014/0292732 A1 * | 10/2014 | Niioka | ................... | G02B 27/22 345/204 |
| 2015/0332647 A1 | 11/2015 | Kurasawa et al. | | |

FOREIGN PATENT DOCUMENTS

JP    2013-076795    4/2013

OTHER PUBLICATIONS

U.S. Appl. No. 14/696,667, filed Apr. 27, 2015, Kurasawa, et al.
U.S. Appl. No. 14/708,856, filed May 11, 2015, Kurasawa, et al.

* cited by examiner

Primary Examiner — Sahlu Okebato
(74) Attorney, Agent, or Firm — Oblon, McClelland, Maier & Neustadt, L.L.P.

(57) ABSTRACT

According to one embodiment, a display device includes first interconnects, second interconnects, an electrode layer, pixel electrodes, a display layer and a controller. The first interconnects extend in a first direction and are arranged in a second direction. The second interconnects extend in the second direction and are arranged in the first direction. The electrode layer is aligned with a plane including the first and the second direction, and has openings. The second interconnects include a first signal line of a first color and a second signal line of the first color most proximal to the first signal line. The controller performs a first operation of supplying signals of a first polarity to the first and the second signal lines. The controller performs a second operation of supplying signals of a second polarity to the first and the second signal lines.

17 Claims, 14 Drawing Sheets

DISPLAY DEVICE AND ELECTRONIC DEVICE

CROSS-REFERENCE TO RELATED APPLICATIONS

This application is based upon and claims the benefit of priority from Japanese Patent Application No. 2014-089254, filed on Apr. 23, 2014; the entire contents of which are incorporated herein by reference.

FIELD

Embodiments described herein relate generally to a display device and an electronic device.

BACKGROUND

A display device that uses a liquid crystal, organic EL, etc., has been developed. For example, a display operation is performed in which an optical characteristic of a liquid crystal layer is changed by setting the potentials of pixel electrodes and a common electrode. A high-quality display is desirable for such a display device.

DETAILED DESCRIPTION

Figure 1:
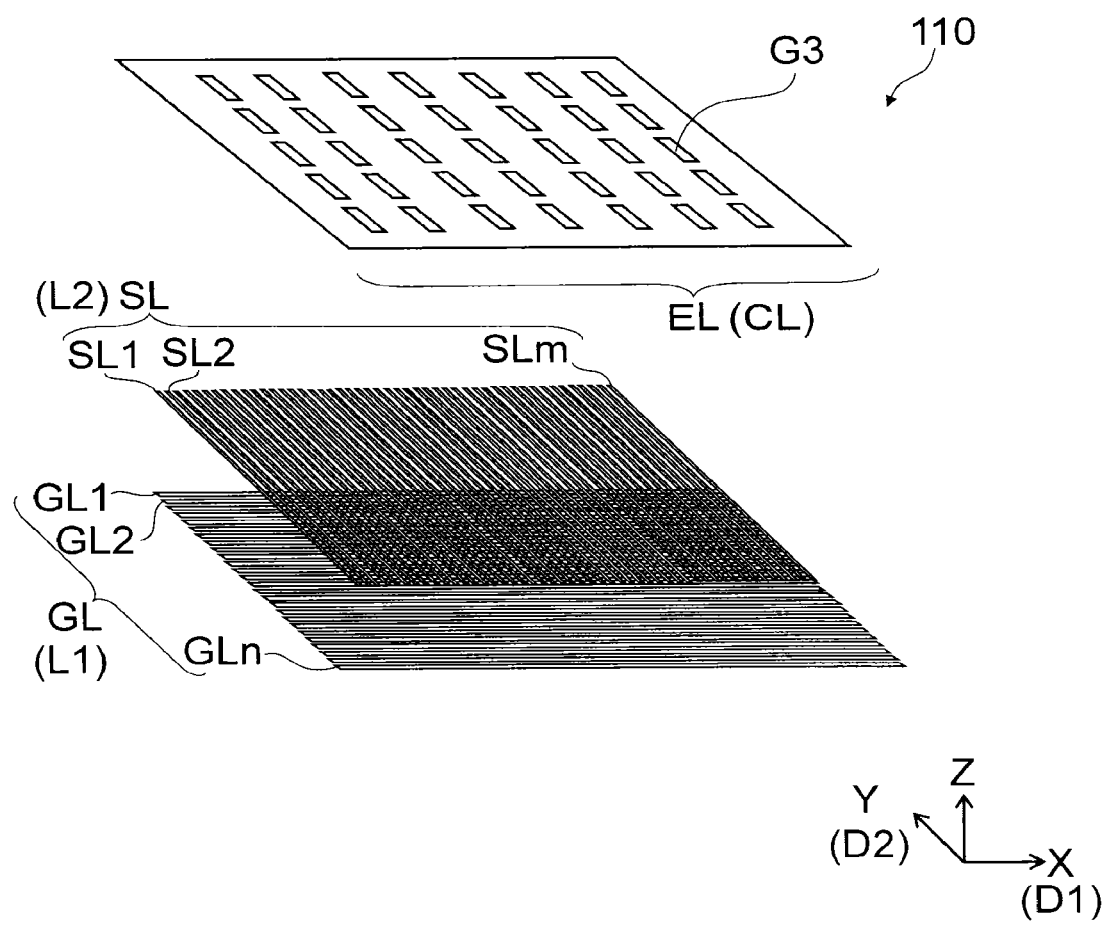
FIG. 1 is a schematic perspective view showing a display device according to a first embodiment.

According to one embodiment, a display device includes a plurality of first interconnects, a plurality of second interconnects, a plurality of switch elements, a plurality of pixel electrodes, an electrode layer, a display layer, a plurality of first color filters of a first color, and a controller. The first interconnects extend in a first direction and are arranged in a second direction intersecting the first direction. The second interconnects extend in the second direction and are arranged in the first direction. Each of the switch elements is electrically connected to one of the first interconnects and one of the second interconnects. The pixel electrodes are electrically connected respectively to the switch elements. The electrode layer is aligned with a plane including the first direction and the second direction. The electrode layer has a plurality of openings piercing the electrode layer in a direction intersecting the plane. The display layer performs an optical operation of at least one of light emission or a change of an optical characteristic based on an electrical signal applied to the pixel electrodes. The controller is electrically connected to the first interconnects, the second interconnects, and the electrode layer. The first interconnects includes a first group and a second group. The first group includes a portion of the first interconnects. The second group includes another portion of the first interconnects and is adjacent to the first group in the second direction. The pixel electrodes include a plurality of first color electrodes. Each of the first color electrodes and one of the first color filters overlap when projected onto the plane. The second interconnects includes a plurality of first color interconnects. The first color interconnects includes a first signal line, and a second signal line of the first color interconnects most proximal to the first signal line. The switch elements include a plurality of first switches, a plurality of second switches, a plurality of third switches, a plurality of fourth switches. The first switches are electrically connected respectively to the first interconnects included in the first group. Each of the first switches is electrically connected to the first signal line. The second switches are electrically connected respectively to the first interconnects included in the second group. Each of the second switches is electrically connected to the first signal line. The third switches are electrically connected respectively to the first interconnects included in the first group. Each of the third switches is electrically connected to the second signal line. The fourth switches are electrically connected respectively to the first interconnects included in the second group. Each of the fourth switches is electrically connected to the second signal line. The first color electrodes includes a plurality of first pixel electrodes electrically connected respectively to the first switches, a plurality of second pixel electrodes electrically connected respectively to the second switches, a plurality of third pixel electrodes electrically connected respectively to the third switches, and a plurality of fourth pixel electrodes electrically connected respectively to the fourth switches. At least a portion of the openings and at least a portion of the first signal line overlap when projected onto the plane. The fourth pixel electrodes, the third pixel electrodes, the second pixel electrodes, the first pixel electrodes, and at least a portion of the electrode layer overlap when projected onto the plane. The controller performs, in a first display interval, a first operation of sequentially selecting the first interconnects included in the first group, supplying a first image signal to the first signal line, and supplying a third image signal to the second signal line. The first image signal has a first polarity having the electrode layer as a reference. The third image signal has the first polarity having the electrode layer as the reference. The controller performs, in a second display interval after the first display interval, a second operation of sequentially selecting the first interconnects included in the second group, supplying a second image signal to the first signal line, and supplying a fourth image signal to the second signal line. The second image signal has a second polarity having the electrode layer as the reference. The second polarity is the reverse of the first polarity. The fourth image signal has the second polarity having the electrode layer as the reference.

According to one embodiment, a display device includes a plurality of first interconnects, a plurality of second interconnects, a plurality of switch elements, a plurality of pixel electrodes, an electrode layer, a display layer, a plurality of first color filters of a first color, and a controller. The first interconnects extend in a first direction and are arranged in a second direction intersecting the first direction. The second interconnects extend in the second direction and are arranged in the first direction. Each of the switch elements is electrically connected to one of the first interconnects and one of the second interconnects. The pixel electrodes are electrically connected respectively to the switch elements. The electrode layer is aligned with a plane including the first direction and the second direction. The electrode layer has a plurality of openings piercing the electrode layer in a direction intersecting the plane. The display layer performs an optical operation of at least one of light emission or a change of an optical characteristic based on an electrical signal applied to the pixel electrodes. The controller is electrically connected to the first interconnects, the second interconnects, and the electrode layer. The first interconnects includes a first group and a second group. The first group includes a portion of the first interconnects. The second group includes another portion of the first interconnects and is adjacent to the first group in the second direction. The pixel electrodes include a plurality of first color electrodes. Each of the first color electrodes and one of the first color filters overlap when projected onto the plane. The second interconnects include a plurality of first color interconnects including a first signal line. The switch elements include a plurality of first switches, and a plurality of second switches. The first switches are electrically connected respectively to the first interconnects included in the first group. Each of the first switches is electrically connected to the first signal line. The second switches are electrically connected respectively to the first interconnects included in the second group. Each of the second switches is electrically connected to the first signal line. The first color electrodes include a plurality of first pixel electrodes electrically connected respectively to the first switches, and a plurality of second pixel electrodes electrically connected respectively to the second switches. At least a portion of the openings and at least a portion of the first signal line overlap when projected onto the plane. The second pixel electrodes, the first pixel electrodes, and at least a portion of the electrode layer overlap when projected onto the plane. The controller performs, in a first display interval of an interval of displaying a first frame, a first operation of sequentially selecting the first interconnects included in the first group and supplying a first signal to the first signal line. The first signal has a first polarity having the electrode layer as a reference. The controller performs, in a second display interval of the interval of displaying the first frame, a second operation of sequentially selecting the first interconnects included in the second group and supplying a second signal to the first signal line. The second display interval is after the first display interval. The second signal has a second polarity having the electrode layer as the reference. The second polarity is the reverse of the first polarity. The controller performs, in a third display interval of an interval of displaying a second frame, a third operation of sequentially selecting the first interconnects included in the first group and supplying a third signal to the first signal line. The second frame is the next frame after the first frame. The third signal has the first polarity having the electrode layer as the reference. The controller performs, in a fourth display interval of the interval of displaying the second frame, a fourth operation of sequentially selecting the first interconnects included in the second group and supplying a fourth signal to the first signal line. The fourth display interval is after the third display interval. The fourth signal has the second polarity having the electrode layer as the reference.

Embodiments will now be described with reference to the drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even in the case where the same portion is illustrated.

In the drawings and the specification of the application, components similar to those described in regard to a drawing thereinabove are marked with like reference numerals, and a detailed description is omitted as appropriate.

First Embodiment

FIG. 1 is a schematic perspective view showing a display device according to a first embodiment.

As shown in FIG. 1, the display device 110 according to the embodiment includes multiple first interconnects L1 (e.g., gate lines GL), multiple second interconnects L2 (e.g., signal lines SL), and an electrode layer EL (e.g., a common electrode CL).

Each of the multiple gate lines GL extends in a first direction D1. The multiple gate lines GL are arranged in a second direction D2. The second direction D2 intersects the first direction D1. In the example, the second direction D2 is perpendicular to the first direction D1.

Each of the multiple signal lines SL extends in the second direction D2. The multiple signal lines SL are arranged in the first direction D1.

The common electrode CL extends along a plane including the first direction D1 and the second direction D2. Multiple openings G3 that are described below are provided in the common electrode CL. As described below, the common electrode CL may be multiple third interconnects L3 (common lines) that extend in the second direction D2 and are arranged in the first direction D1.

A plane that includes the first direction D1 and the second direction D2 is taken as an X-Y plane. A direction perpendicular to the X-Y plane is taken as a Z-axis direction. One direction in the X-Y plane is an X-axis direction. One direction in the X-Y plane is a Y-axis direction. The Y-axis direction is perpendicular to the X-axis direction. In the example, the first direction D1 is parallel to the X-axis direction. The second direction D2 is parallel to the Y-axis direction.

The multiple gate lines GL include, for example, a first gate line GL1, a second gate line GL2, and an nth gate line GLn. The number of gate lines GL is n. n is an integer not less than 2. For example, n is 1920. In the embodiment, n is arbitrary.

The multiple signal lines SL include, for example, an mth signal line SLm. The number of signal lines SL is m. m is an integer not less than 2. For example, m is 1080×3. In other words, for example, in the case where the set of a red pixel, a green pixel, and a blue pixel is used as one component, the number of components is 1080. The signal lines SL are provided according to the number of multiple pixels arranged along the X-axis direction. In the embodiment, m is arbitrary.

For example, the multiple signal lines SL are divided into multiple groups. Each of the multiple groups includes multiple signal lines SL that are adjacent to each other. For example, the number of signal lines SL included in one group is an integer not less than 2.

For example, the common electrode CL and each of the groups of the multiple signal lines SL overlap when projected onto the X-Y plane.

Figure 2:
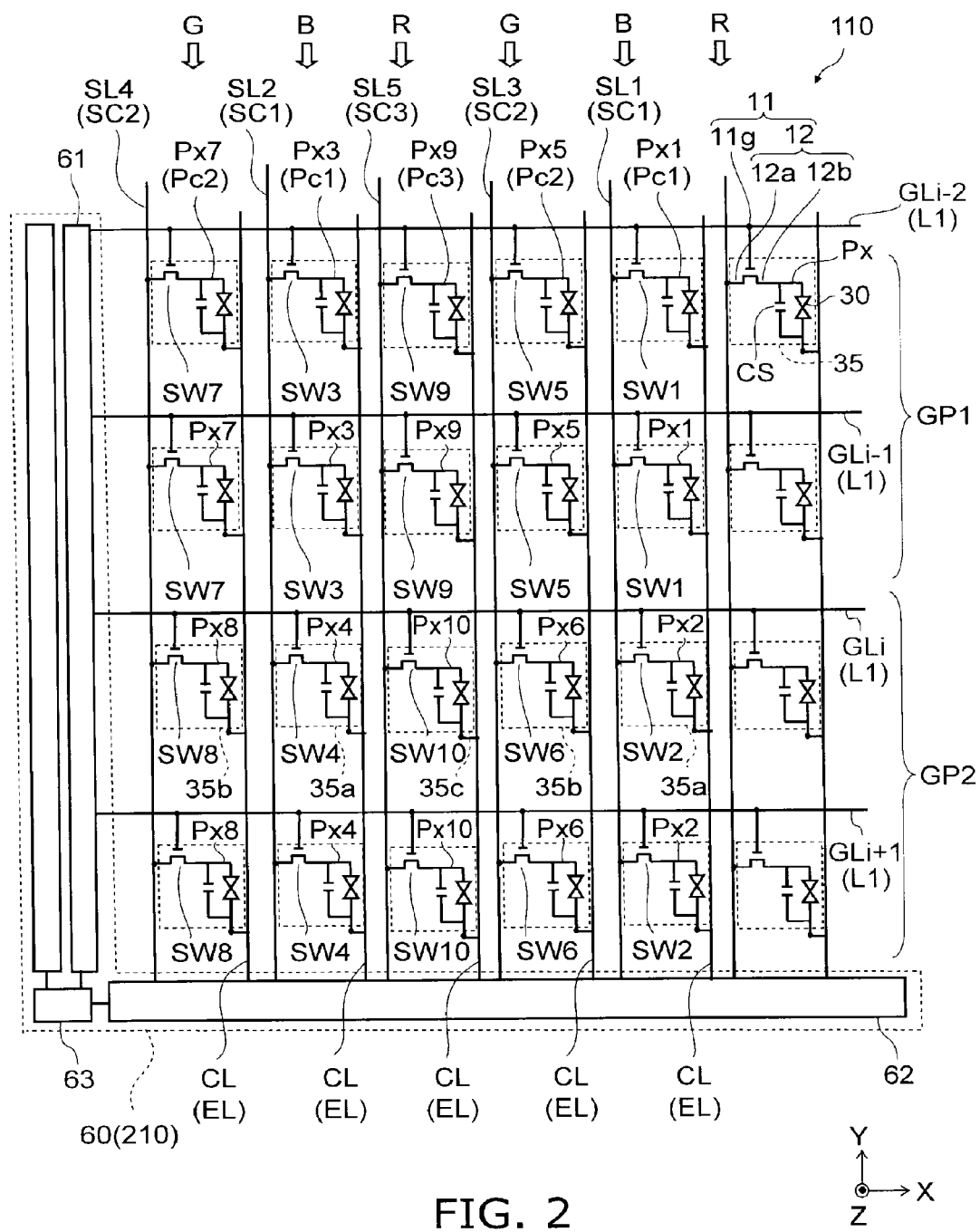
FIG. 2 is a schematic view showing the display device according to the first embodiment.

FIG. 2 is a schematic view showing the display device according to the first embodiment.

As shown in FIG. 2, multiple switch elements 11, multiple pixel electrodes Px, and a display layer 30 are provided in the display device 110. Each of the multiple switch elements 11 is electrically connected to one of the multiple gate lines GL and one of the multiple signal lines SL.

In the embodiment, the state of being electrically connected includes the state in which two conductors are in direct contact, and the state in which a current flows between two conductors that have another conductor inserted therebetween. Further, the state of being electrically connected includes the state in which it is possible to form a state in which a current flows between two conductors that have an element (e.g., a switch element or the like) inserted therebetween.

For example, the switch element 11 includes a gate 11g and a semiconductor layer 12. The semiconductor layer 12 includes a first semiconductor portion 12a and a second semiconductor portion 12b. The gate 11g is electrically connected to one of the multiple gate lines GL. The first semiconductor portion 12a of the semiconductor layer 12 is electrically connected to one of the multiple signal lines SL.

The multiple pixel electrodes Px are electrically connected respectively to the multiple switch elements 11. For example, one pixel electrode Px is electrically connected to the second semiconductor portion 12b of the semiconductor layer 12 of the switch element 11.

The display layer 30 performs an optical operation based on an electrical signal applied to the multiple pixel electrodes Px. The optical operation includes at least one of light emission or a change of an optical characteristic. As described below, for example, the multiple pixel electrodes Px are provided between the display layer 30 and the common electrode CL.

In the case where a liquid crystal layer is used as the display layer 30, the optical operation includes a change of an optical characteristic. The optical characteristic includes, for example, at least one of birefringence, optical rotatory properties, scattering properties, light reflectance, or light absorptance. For example, the liquid crystal alignment of the display layer 30 (the liquid crystal layer) changes due to the electrical signal that is applied to the pixel electrodes Px; and the effective birefringence changes. At least one of optical rotatory properties, scattering properties, light reflectance, or light absorptance may change.

For example, in the case where a light emitting layer (e.g., an organic light emitting layer) is used as the display layer 30, the optical operation includes light emission (the emission of light). In other words, the display layer 30 performs an optical operation of at least one of light emission or a change of an optical characteristic.

For example, the display layer 30 is used as a load capacitance. In the example, a storage capacitor Cs is provided in parallel with the display layer 30. The storage capacitor Cs may be provided as necessary and may be omitted.

Multiple pixels 35 are provided in the display device 110. At least one switch element 11 and at least one pixel electrode Px are provided in each of the multiple pixels 35. In other words, the multiple switch elements 11 are provided respectively in the multiple pixels 35. The multiple pixel electrodes Px are provided respectively in the multiple pixels 35.

As shown in FIG. 2, a controller 60 (a drive device 210) is provided in the display device 110.

For example, the controller 60 includes a drive circuit 61 (a first drive circuit 61), a drive circuit 62 (a second drive circuit 62), and a control circuit 63. The first drive circuit 61 is electrically connected to the multiple gate lines GL. The second drive circuit 62 is electrically connected to the common electrode CL and the multiple signal lines SL. The control circuit 63 is electrically connected to the first drive circuit 61 and the second drive circuit 62. The appropriate signal processing of the electrical signals (including image signals) acquired by the control circuit 63 is performed. The electrical signals for which the signal processing is performed are supplied to the first drive circuit 61 and the second drive circuit 62.

As shown in FIG. 2, the multiple gate lines GL include a first group GP1 and a second group GP2. As described below, for example, the display at the pixels 35 corresponding to the first group GP1 is performed by sequentially scanning the gate lines GL included in the first group GP1. Subsequently, the display at the pixels 35 corresponding to the second group GP2 is performed by sequentially scanning the gate lines GL included in the second group GP2. The number of multiple groups is, for example, not less than 2 and not more than 100, e.g., about 20. This value is an example; and the number of groups in the embodiment is arbitrary. As described below, for example, a non-display operation may be performed between the scanning of the two groups.

The first group GP1 includes a portion of the multiple gate lines GL (e.g., an (i−2)th gate line GL(i−2), an (i−1)th gate line GL(i−1), etc., where i is an integer not less than 3).

The second group GP2 is disposed to be adjacent to the first group GP1 in the Y-axis direction. The second group GP2 includes another portion of the multiple gate lines GL (e.g., an ith gate line GL(i), an (i+1)th gate line GL(i+1), etc.).

The multiple signal lines SL include multiple first color interconnects SC1, multiple second color interconnects SC2, and multiple third color interconnects SC3.

Each of the multiple first color interconnects SC1 is, for example, a signal line SL that corresponds to a first color. The first color is, for example, one of red (R), green (G), or blue (B). In the example, the first color is blue.

The multiple first color interconnects SC1 include a first signal line SL1 and a second signal line SL2. The second signal line SL2 is separated from the first signal line SL1 in the X-axis direction. The second signal line SL2 is the signal line most proximal to the first signal line SL1 of the signal lines SL corresponding to the first color.

Each of the multiple second color interconnects SC2 is, for example, a signal line SL that corresponds to a second color that is different from the first color. In the example, the second color is green. The multiple second color interconnects SC2 include a third signal line SL3 and a fourth signal line SL4.

The third signal line SL3 is disposed to be next to (adjacent to) the first signal line SL1 in the X-axis direction. For example, the third signal line SL3 is most proximal to the first signal line SL1 of the multiple signal lines SL in the X-axis direction. For example, the third signal line SL3 is disposed between the first signal line SL1 and the second signal line SL2.

The fourth signal line SL4 is adjacent to (disposed to be next to) the second signal line SL2 in the X-axis direction. For example, the fourth signal line SL4 is most proximal to the second signal line SL2 of the multiple signal lines SL in the X-axis direction. For example, the second signal line SL2 is disposed between the third signal line SL3 and the fourth signal line SL4.

The multiple third color interconnects SC3 are the signal lines SL that correspond to a third color. The third color is different from the first color and different from the second color. In the example, the third color is red. For example, each of the signal lines SL that correspond to the red pixels is disposed between a signal line SL that corresponds to the blue pixels and a signal line SL that corresponds to the green pixels. For example, the multiple third color interconnects SC3 include a fifth signal line SL5. The fifth signal line SL5 is disposed between the third signal line SL3 and the second signal line SL2.

The multiple switch elements 11 include multiple first to tenth switches SW1 to SW10.

Each of the multiple first switches SW1 is electrically connected to the first signal line SL1; and the multiple first switches SW1 are electrically connected respectively to the multiple gate lines GL included in the first group GP1.

Each of the multiple second switches SW2 is electrically connected to the first signal line SL1; and the multiple second switches SW2 are electrically connected respectively to the multiple gate lines GL included in the second group GP2.

Each of the multiple third switches SW3 is electrically connected to the second signal line SL2; and the multiple third switches SW3 are electrically connected respectively to the multiple gate lines GL included in the first group GP1.

Each of the multiple fourth switches SW4 is electrically connected to the second signal line SL2; and the multiple fourth switches SW4 are electrically connected respectively to the multiple gate lines GL included in the second group GP2.

Each of the multiple fifth switches SW5 is electrically connected to the third signal line SL3; and the multiple fifth switches SW5 are electrically connected respectively to the multiple gate lines GL included in the first group GP1.

Each of the multiple sixth switches SW6 is electrically connected to the third signal line SL3; and the multiple sixth switches SW6 are electrically connected respectively to the multiple gate lines GL included in the second group GP2.

Each of the multiple seventh switches SW7 is electrically connected to the fourth signal line SL4; and the multiple seventh switches SW7 are electrically connected respectively to the multiple gate lines GL included in the first group GP1.

Each of the multiple eighth switches SW8 is electrically connected to the fourth signal line SL4; and the multiple eighth switches SW8 are electrically connected respectively to the multiple gate lines GL included in the second group GP2.

Each of the multiple ninth switches SW9 is electrically connected to the fifth signal line SL5; and the multiple ninth switches SW9 are electrically connected respectively to the multiple gate lines GL included in the first group GP1.

Each of the multiple tenth switches SW10 is electrically connected to the fifth signal line SL5; and the multiple tenth switches SW10 are electrically connected respectively to the multiple gate lines GL included in the second group GP2.

The multiple pixel electrodes Px include multiple first color electrodes Pc1, multiple second color electrodes Pct, and multiple third color electrodes Pc3. The first to third color electrodes Pc1 to Pc3 are the pixel electrodes Px that correspond respectively to the first to third colors.

The multiple first color electrodes Pc1 include multiple first pixel electrodes Px1, multiple second pixel electrodes Px2, multiple third pixel electrodes Px3, and multiple fourth pixel electrodes Px4.

The multiple first pixel electrodes Px1 are electrically connected respectively to the multiple first switches SW1. The multiple second pixel electrodes Px2 are electrically connected respectively to the multiple second switches SW2. The multiple third pixel electrodes Px3 are electrically connected respectively to the multiple third switches SW3. The multiple fourth pixel electrodes Px4 are electrically connected respectively to the multiple fourth switches SW4.

The multiple second color electrodes Pct include multiple fifth pixel electrodes Px5, multiple sixth pixel electrodes Px6, multiple seventh pixel electrodes Px7, and multiple eighth pixel electrodes Px8.

The multiple fifth pixel electrodes Px5 are electrically connected respectively to the multiple fifth switches SW5. The multiple sixth pixel electrodes Px6 are electrically connected respectively to the multiple sixth switches SW6. The multiple seventh pixel electrodes Px7 are electrically connected respectively to the multiple seventh switches SW7. The multiple eighth pixel electrodes Px8 are electrically connected respectively to the multiple eighth switches SW8.

The multiple third color electrodes Pc3 include multiple ninth pixel electrodes Px9 and multiple tenth pixel electrodes Px10.

The multiple ninth pixel electrodes Px9 are electrically connected respectively to the multiple ninth switches SW9. The multiple tenth pixel electrodes Px10 are electrically connected respectively to the multiple tenth switches SW10.

A portion of the common electrode CL and at least a portion of each of the first to tenth pixel electrodes Px1 to Px10 overlap when projected onto the X-Y plane (a plane including the first direction D1 and the second direction D2).

In the example as shown in FIG. 2, the multiple pixels 35 include a first color pixel 35a, a second color pixel 35b, and a third color pixel 35c. In the embodiment, modifications of the combinations of the multiple colors are possible. The pixels 35 having four or more colors may be provided.

Figure 3:
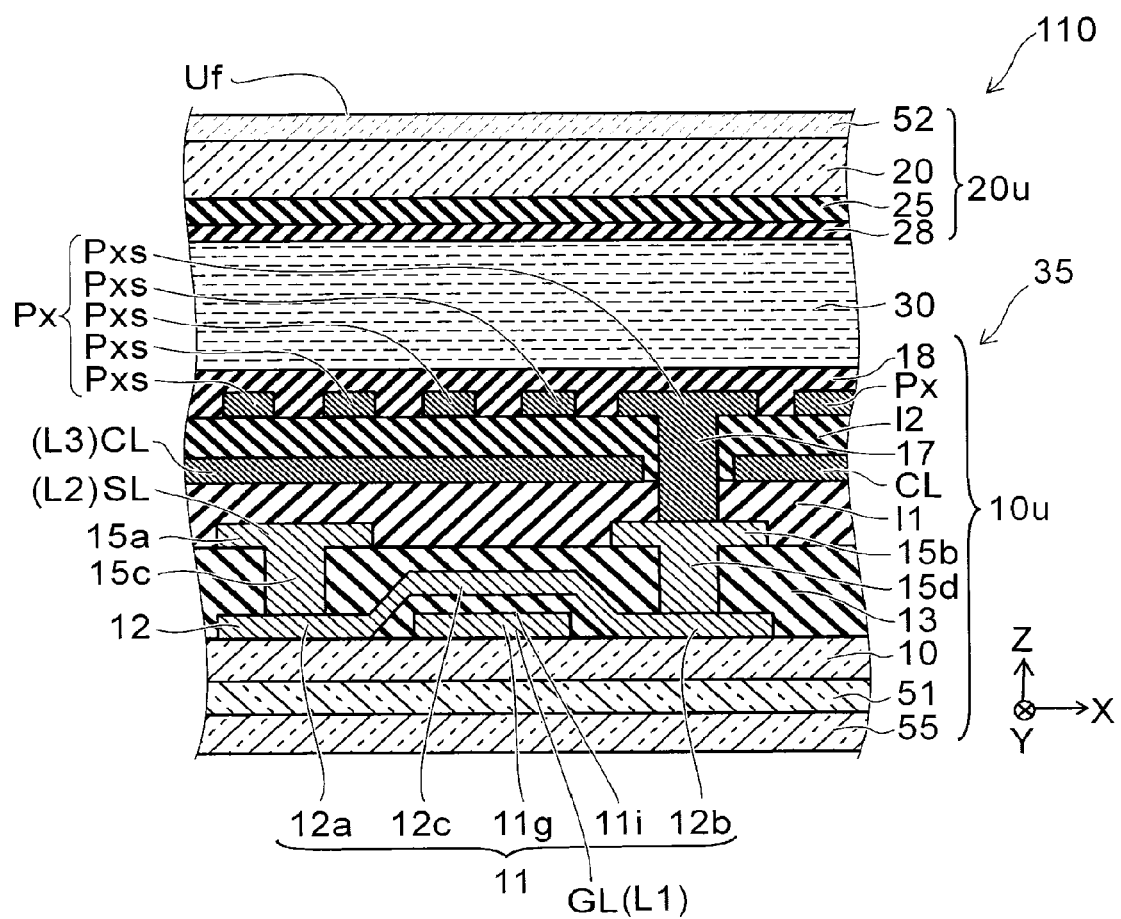
FIG. 3 is a schematic cross-sectional view showing the display device according to the first embodiment.

FIG. 3 is a schematic cross-sectional view showing the display device according to the first embodiment.

As shown in FIG. 3, a first substrate unit 10u, a second substrate unit 20u, and the display layer 30 are provided in the display device 110. The multiple pixels 35 are provided in the display device 110. FIG. 3 shows a portion of one pixel 35.

For example, a TFT (thin film transistor) array substrate is used as the first substrate unit 10u. For example, a first substrate 10, the gate lines GL (the first interconnects L1), the switch elements 11, the signal lines SL (the second interconnects L2), the common electrode CL (the electrode layer EL), and the pixel electrodes Px are provided in the first substrate unit 10u. The first substrate unit 10u extends in the X-Y plane.

In the example, the first substrate 10 is light-transmissive. The first substrate 10 includes, for example, glass or a resin. The gate lines GL are provided on the first substrate 10.

In the example, a TFT is used as the switch element 11. The switch element 11 includes the semiconductor layer 12. The semiconductor layer 12 includes the first semiconductor portion 12a, the second semiconductor portion 12b, and a third semiconductor portion 12c. The second semiconductor portion 12b is separated from the first semiconductor portion 12a in the X-Y plane. The third semiconductor portion 12c is disposed between the first semiconductor portion 12a and the second semiconductor portion 12b. The first semiconductor portion 12a is used as one of the source or the drain of the switch element 11. The second semiconductor portion 12b is used as the other of the source or the drain. The third semiconductor portion 12c is used as the channel portion of the switch element 11.

The switch element 11 further includes the gate 11g and a gate insulator film 11i. The gate insulator film 11i is provided between the third semiconductor portion 12c and the gate 11g. In the example, the third semiconductor portion 12c is disposed on the gate 11g. In the example, the switch element 11 has a bottom-gate structure. In the embodiment, the switch element 11 may have a top-gate structure.

The signal line SL is electrically connected to the first semiconductor portion 12a. In the example, a portion (a first connection portion 15a) of the signal line SL is electrically connected to the first semiconductor portion 12a. In the example, the first connection portion 15a is electrically connected to the first semiconductor portion 12a by a first connecting conductive portion 15c.

On the other hand, a second connecting conductive portion 15d is provided on the second semiconductor portion 12b. A second connection portion 15b is provided on the second connecting conductive portion 15d.

An inter-layer insulating layer 13 is provided between the first connection portion 15a (the signal line SL) and the semiconductor layer 12, between the first connecting conductive portion 15c and the semiconductor layer 12, between the second connection portion 15b and the semiconductor layer 12, and between the second connecting conductive portion 15d and the semiconductor layer 12.

In the example, the common electrode CL is provided on the signal lines SL, etc. A first insulating layer I1 is provided between the common electrode CL and the signal lines SL. The first insulating layer I1 is provided between the multiple signal lines SL and the common electrode CL.

The pixel electrode Px is provided on the common electrode CL. In the example, the pixel electrode Px has a comb-shaped configuration; and the pixel electrode Px includes multiple portions Pxs having band configurations. The multiple portions Pxs are separated from each other in the X-Y plane. The pixel electrode Px is electrically connected to the second connection portion 15b. In the example, the pixel electrode Px is electrically connected to the second connection portion 15b by a third connecting conductive portion 17.

At least one of the common electrode CL or the pixel electrode Px includes, for example, a conductive layer that is light-transmissive. For example, at least one of the common electrode CL or the pixel electrode Px includes an oxide including at least one element selected from the group consisting of In, Sn, Zn, and Ti. The common electrode CL and the pixel electrode Px include, for example, ITO (Indium Tin Oxide), etc. For example, a thin metal layer that is light-transmissive may be used as the common electrode CL and the pixel electrode Px. As described below, supplemental interconnects may be provided on the common electrode CL.

A second insulating layer 12 is provided between the common electrode CL and the pixel electrodes Px. In the example, at least a portion of the common electrode CL is disposed between at least a portion of one of the multiple pixel electrodes Px and at least a portion of one of the multiple signal lines SL. The second insulating layer 12 is disposed between the at least a portion of the common electrode CL recited above and the at least a portion of the one of the multiple pixel electrodes Px recited above.

In the example, a first alignment film 18 is provided on the pixel electrodes Px.

The second substrate unit 20u is separated from the first substrate unit 10u in the Z-axis direction. In the example, the second substrate unit 20u includes a second substrate 20, a colored layer 25, and a second alignment film 28. The colored layer 25 is provided between the second substrate 20 and the first substrate unit 10u. The second alignment film 28 is provided between the colored layer 25 and the first substrate unit 10u.

In the example, the second substrate 20 is light-transmissive.

The colored layer 25 includes, for example, a red colored layer, a green colored layer, a blue colored layer, etc. The red colored layer, the green colored layer, and the blue colored layer are disposed to correspond respectively to the multiple pixels 35. The colored layer 25 may have four or more colors.

The display layer 30 is provided between the first substrate unit 10u and the second substrate unit 20u. For example, the display layer 30 is disposed between the first alignment film 18 and the second alignment film 28.

A first polarizing layer 51 and a second polarizing layer 52 are provided in the example. The first substrate unit 10u is disposed between the first polarizing layer 51 and the second polarizing layer 52. The second substrate unit 20u is disposed between the first substrate unit 10u and the second polarizing layer 52.

A backlight unit 55 is further provided in the example. The first polarizing layer 51, the first substrate unit 10u, the display layer 30, and the second substrate unit 20u are disposed between the backlight unit 55 and the second polarizing layer 52. The backlight unit 55 emits light. The light passes through the first polarizing layer 51, the first substrate unit 10u, the display layer 30, the second substrate unit 20u, and the second polarizing layer 52 and is emitted outside the display device 110.

A "lateral electric field" is generated between the pixel electrode Px and the common electrode CL. The lateral electric field is an electric field that has a component parallel to the X-Y plane. The director of the liquid crystal molecules (the long-axis direction of the liquid crystal molecules) of the display layer 30 (the liquid crystal layer) changes in the X-Y plane due to the lateral electric field. For example, at least one of the birefringence or the optical rotatory properties changes due to the change of the direction of the director. In other words, a change of an optical characteristic occurs. The change of the optical characteristic is converted to a change of the transmittance by using a polarizing layer.

The transmittance of the light emitted from the backlight unit 55 changes due to the change of the optical characteristic. The transmittance of the light changes, that is, the brightness changes, according to the electrical signal (the image signal) applied to the pixel electrode Px. The light of which the brightness has changed is emitted from an upper surface Uf of the display device 110. Thereby, the display is performed.

At least a portion of the controller 60 may be provided in the first substrate unit 10u. At least a portion of the controller 60 may be included in the drive device 210 of the display device (referring to FIG. 2). At least a portion of the drive device 210 may be included in the controller 60.

Figure 4A:
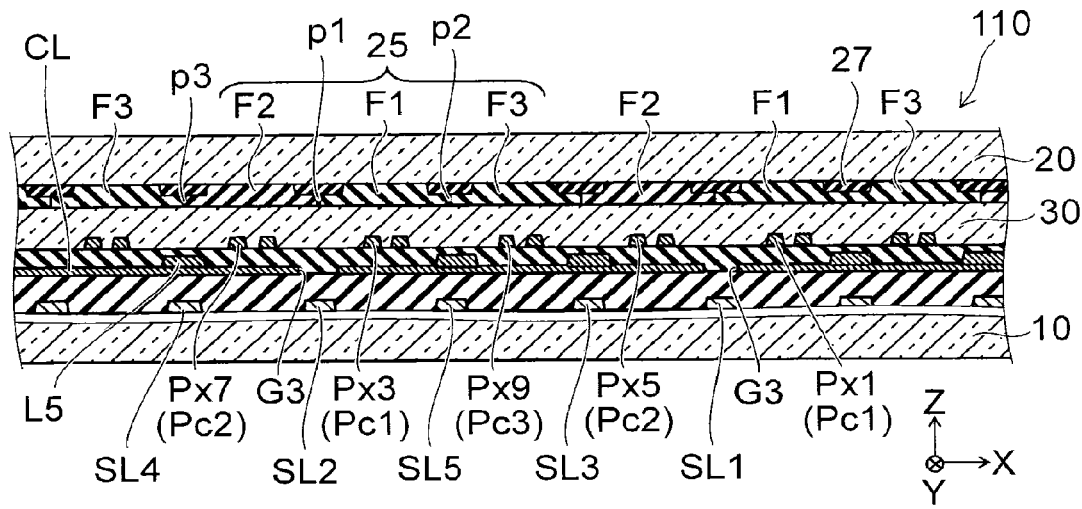
FIG. 4A and FIG. 4B are schematic cross-sectional views showing the display device according to the first embodiment.
Figure 4B:
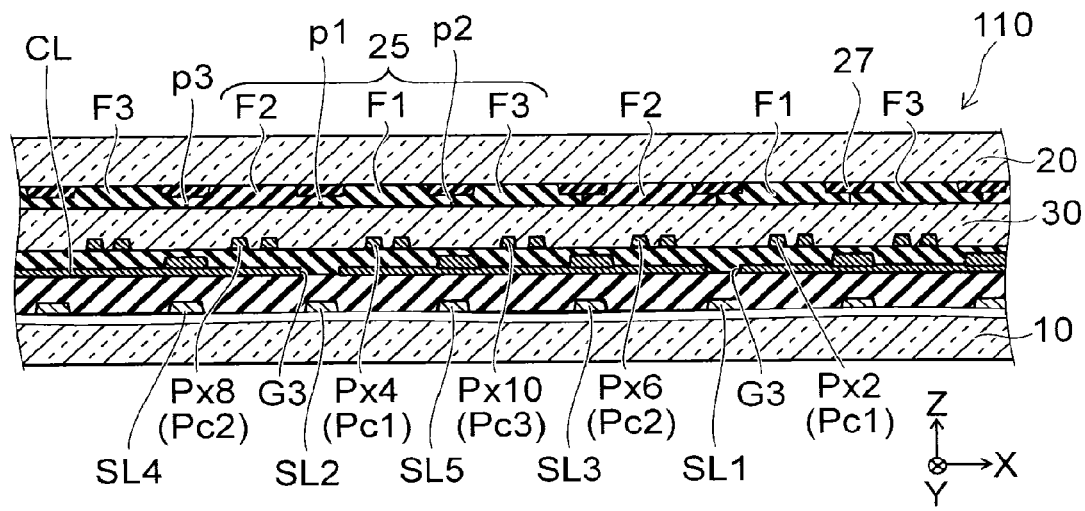

FIG. 4A and FIG. 4B are schematic cross-sectional views showing the display device according to the first embodiment.

These drawings are cross-sectional views in which the display device is cut in the X-Z plane. FIG. 4A is a cross-sectional view at a position corresponding to the first group GP1. FIG. 4B is a cross-sectional view at a position corresponding to the second group GP2.

The colored layer 25 is provided in the second substrate unit 20u in the example as shown in FIG. 4A and FIG. 4B. For example, the second alignment film 28 (not shown in FIGS. 4A and 4B) is disposed between the colored layer 25 and the display layer 30. In the embodiment, the position of the colored layer 25 in the Z-axis direction is arbitrary. For example, the colored layer 25 may be provided in the first substrate unit 10u.

The colored layer 25 includes, for example, first to third color filters F1 to F3.

Namely, the display device 110 further includes the multiple first color filters F1 of the first color, the multiple second color filters F2 of the second color, and the third color filters F3 of the third color.

The visibility of the second color is higher than the visibility of the first color. The visibility of the third color is higher than the visibility of the first color. The third color is different from the second color. The first color is, for example, blue. The second color is green; and the third color is red. The second color may be red; and the third color may be green. Hereinbelow, the second color is green; and the third color is red.

At least a portion of the multiple first color filters F1 and a portion of the multiple pixel electrodes overlap when projected onto the X-Y plane.

As shown in FIG. 4A and FIG. 4B, the multiple first color electrodes Pc1 and one of the multiple first color filters F1 overlap when projected onto the X-Y plane.

At least a portion of the multiple second color filters F2 and a portion of the multiple pixel electrodes overlap when projected onto the X-Y plane.

As shown in FIG. 4A and FIG. 4B, the multiple second color electrodes Pc2 and one of the multiple second color filters F2 overlap when projected onto the X-Y plane. The multiple third color electrodes Pc3 and one of the multiple third color filters F3 overlap when projected onto the X-Y plane.

The first to third color filters F1 to F3 are provided repeatedly along the X-axis direction.

For example, the signal line SL (the first color interconnect SC1) of the multiple signal lines SL corresponding to the first color is the signal line SL electrically connected to one of the multiple first color electrodes Pc1 via the switch element 11.

Similarly, the signal line SL (the second color interconnect SC2) that corresponds to the second color is the signal line SL electrically connected to one of the multiple second color electrodes Pc2 via the switch element 11. The signal line SL (the third color interconnect SC3) that corresponds to the third color is the signal line SL electrically connected to one of the multiple third color electrodes Pc3 via the switch element 11.

For example, the image signal that corresponds to the first color is supplied to the first signal line SL1 and the second signal line SL2 from the controller 60; the potentials of the first pixel electrodes Px1, the second pixel electrodes Px2, the third pixel electrodes Px3, and the fourth pixel electrodes Px4 are controlled; and the optical operation of the display layer 30 is performed. At this time, the intensity of the light of the first color is controlled by the light passing through the first color filters F1.

The image signal that corresponds to the second color is supplied to the third signal line SL3 and the fourth signal line SL4 from the controller 60; the potentials of the fifth pixel electrodes Px5, the sixth pixel electrodes Px6, the seventh pixel electrodes Px7, and the eighth pixel electrodes Px8 are controlled; and the optical operation of the display layer 30 is performed. At this time, the intensity of the light of the second color is controlled by the light passing through the second color filters F2.

The image signal that corresponds to the third color is supplied to the fifth signal line SL5 from the controller 60; the potentials of the ninth pixel electrodes Px9 and the tenth pixel electrodes Px10 are controlled; and the optical operation of the display layer 30 is performed. At this time, the intensity of the light of the third color is controlled by the light passing through the third color filters F3.

The desired display having the desired colors is performed by implementing these operations.

The colored layer 25 includes a first boundary portion p1 between the first color filter F1 and the second color filter F2, a second boundary portion p2 between the first color filter F1 and the third color filter F3, and a third boundary portion p3 between the second color filter F2 and the third color filter F3.

In the example, a light-shielding layer 27 (e.g., a black matrix) is provided. The light-shielding layer 27 has portions that overlap the first boundary portion p1, the second boundary portion p2, and the third boundary portion p3 when projected onto the X-Y plane. Thereby, light leakage can be suppressed; and a higher-quality display is obtained. For example, the light-shielding layer 27 and at least one of the multiple signal lines SL overlap when projected onto the X-Y plane.

As shown in FIG. 4A and FIG. 4B, for example, the multiple openings G3 (the slits) are provided in the electrode layer EL (the common electrode CL). The openings G3 pierce the electrode layer EL (the common electrode CL) in a direction (e.g., the Z-direction) intersecting the X-Y plane. At least a portion of the multiple openings G3 and at least a portion of the first signal line SL1 overlap when projected onto the X-Y plane. In the example, at least a portion of the multiple openings G3 and at least a portion of the second signal line SL2 also overlap. For example, each of the openings G3 is provided along the signal line SL.

The openings G3 and at least one of the first boundary portion p1, the second boundary portion p2, or the third boundary portion p3 overlap when projected onto the X-Y plane. For example, the openings G3 and a region (e.g., the first boundary portion p1) between the first pixel electrode Px1 and the fifth pixel electrode Px5 overlap when projected onto the X-Y plane.

As shown in FIG. 4A and FIG. 4B, the common electrode CL and at least a portion of each of the first to tenth pixel electrodes Px1 to Px10 overlap when projected onto the X-Y plane.

Thus, in the display device according to the embodiment, the openings G3 are provided in a portion of the electrode layer EL (the common electrode CL) on the signal lines SL (the second interconnects L2). Thereby, for example, the yield of the manufacturing of the display device can be increased. For example, there are cases where foreign matter enters between the common electrode CL and the signal lines SL in the manufacturing processes of the display device. For example, due to the foreign matter, shorts occur between the common electrode CL and the signal lines SL; and the yield of the display device decreases. In the display device 110, because the openings G3 are provided in a portion of the common electrode CL on the signal lines, shorts do not occur easily between the common electrode CL and the signal lines SL even in the case where the foreign matter occurs. Thereby, the yield of the display device can be increased.

On the other hand, it is unfavorable to provide the openings in all of the portions of the common electrode CL positioned on the signal lines SL. For example, by increasing the surface area in the X-Y plane of the openings, the electrical resistance of the common electrode CL increases; and the power consumption of the driving of the display device increases.

Also, for example, the common electrode CL is used as a shield that shields the electric field between the signal lines SL and the pixel electrodes Px, etc. For example, the coupling between the signal lines SL and the pixel electrodes Px becomes large if there are too many openings provided in the common electrode CL. There are cases where the uniformity of the display undesirably decreases. For example, there are cases where the unevenness of the display is highly noticeable when the openings are provided on the signal lines corresponding to green.

It is favorable for the openings to be provided in some of the portions of the common electrode CL positioned on the signal lines SL. For example, it is favorable for the openings to be provided on the signal lines corresponding to blue.

Multiple supplemental interconnects L5 are further provided in the example. Each of the multiple supplemental interconnects L5 extends in the Y-axis direction. Each of the multiple supplemental interconnects L5 is electrically connected to the common electrode CL. The electrical resistance of each of the multiple supplemental interconnects L5 is lower than the electrical resistance of the common electrode CL.

As described above, a conductive material that is light-transmissive is used as the common electrode CL. On the other hand, the supplemental interconnects L5 include a material (a metal, etc.) that has a low resistance. Thereby, the effective resistance of the common electrode CL can be reduced. The occurrence of the crosstalk can be suppressed.

The multiple signal lines SL and at least one of the multiple supplemental interconnects L5 overlap when projected onto the X-Y plane. In the example, when projected onto the X-Y plane, the multiple supplemental interconnects L5 and the second boundary portion p2 overlap, or the multiple supplemental interconnects L5 and the third boundary portion p3 overlap.

Examples of the operation of the display device 110 will now be described.

Figure 5:
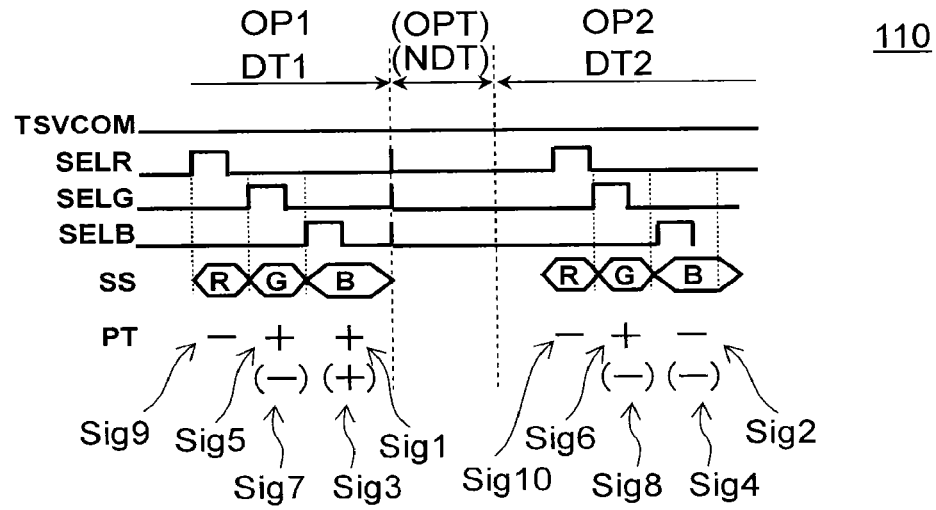
FIG. 5 is a schematic view showing the operations of the display device according to the first embodiment.

FIG. 5 is a schematic view showing the operations of the display device according to the first embodiment.

FIG. 5 is a time chart showing the operations of the display device 110. The horizontal axis is time. Selector signals SELR, SELG, and SELB and a source signal SS are shown in FIG. 5. A red signal line selector, a green signal line selector, and a blue signal line selector (not shown) are provided. These selectors are electrically connected to the signal lines SL. The selector signals SELR, SELG, and SELB are the signals supplied to the red signal line selector, the green signal line selector, and the blue signal line selector, respectively. The source signal SS is the signal supplied to the signal lines SL. These signals are supplied by the controller 60. A polarity PT of the source signal SS is shown in FIG. 5. The polarity PT is, for example, the signal of the source signal SS when the potential of the common electrode CL is used as a reference.

As shown in FIG. 5, a first display interval DT1 and a second display interval DT2 are provided. The second display interval DT2 is the interval after the first display interval DT1. A non-display interval NDT may be provided between the first display interval DT1 and the second display interval DT2. For example, a non-display operation (a sense operation OPT) described below may be performed in the non-display interval NDT.

The controller 60 implements a first operation OP1 in the first display interval DT1. In the first operation OP1, the display at the pixels 35 corresponding to the first group GP1 is performed. In other words, the information for the display is written to the pixels 35 corresponding to the first group GP1.

The controller 60 implements a second operation OP2 in the second display interval DT2. In the second operation OP2, the display at the pixels 35 corresponding to the second group GP2 is performed. In other words, the information for the display is written to the pixels 35 corresponding to the second group GP2.

In the first operation OP1 and the second operation OP2, the selector signals are sequentially set to the high state (the selected state); and the image signal that corresponds to the desired image data is supplied as the source signal SS.

At this time, in the embodiment, the polarity PT of the source signal SS supplied to the first signal line SL1 and corresponding to blue is, for example, positive in the first operation OP1. In the second operation OP2, the polarity PT of the source signal SS supplied to the first signal line SL1 and corresponding to blue is, for example, negative. Thus, in the embodiment, the polarity PT is inverted for the blue pixels.

On the other hand, in the first operation OP1 and the second operation OP2, the polarity PT of the source signal SS supplied to the third signal line SL3 and corresponding to green is, for example, positive.

Similarly, in the first operation OP1 and the second operation OP2, the polarity PT of the source signal SS supplied to the fifth signal line SL5 and corresponding to red is, for example, negative.

In other words, the signals that are supplied have different polarities between the red signal line and the green signal line that are adjacent to each other. For red and green, the signals that are supplied to the signal lines SL have the same polarity between the first operation OP1 and the second operation OP2. On the other hand, for the blue signal lines SL, the polarity of the signal is inverted between the first operation OP1 and the second operation OP2.

Examples of the first operation OP1 and the second operation OP2 will now be described further.

Figure 6:
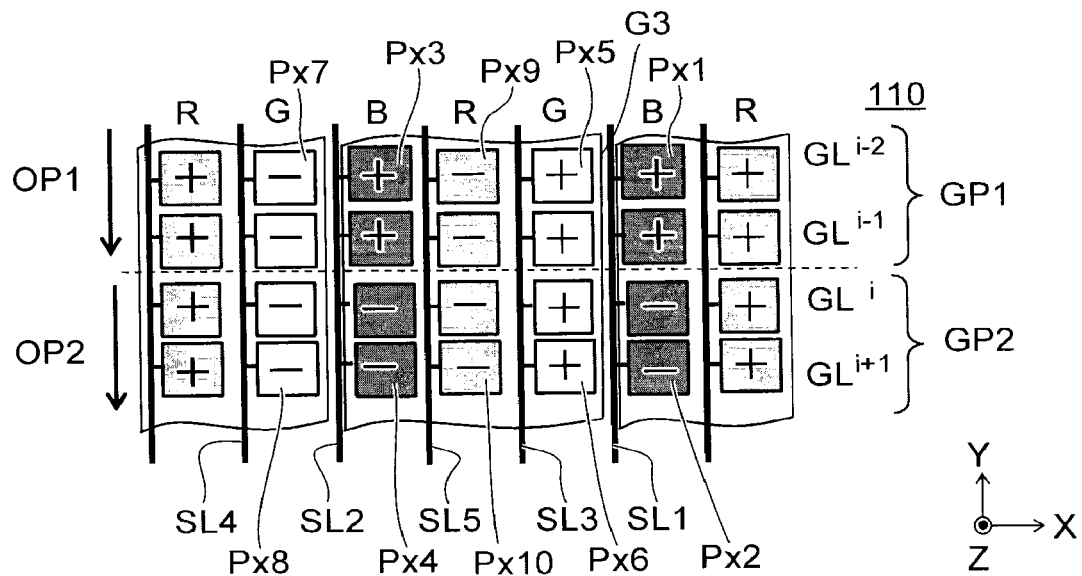
FIG. 6 is a schematic view showing the operations of the display device according to the first embodiment.

FIG. 6 is a schematic view showing the operations of the display device according to the first embodiment.

FIG. 6 shows the polarities of the signals of the display device 110.

As shown in FIG. 6, the first operation OP1 (the first display operation) is performed for the first group GP1; and subsequently, the second operation OP2 (the second display operation) is performed for the second group GP2.

In the first operation OP1, the controller 60 sequentially selects the multiple gate lines GL included in the first group GP1 (referring to FIG. 2) and supplies a first image signal Sig1 (referring to FIG. 5) to the first signal line SL1. Also, a third image signal Sig3 is supplied to the second signal line SL2.

The first image signal Sig1 and the third image signal Sig3 have the first polarity when the potential of the common electrode CL is used as the reference. In the example of FIG. 6, the first polarity is positive ("+").

In the second operation OP2, the controller 60 sequentially selects the multiple gate lines GL included in the second group GP2 (referring to FIG. 2) and supplies a second image signal Sig2 (referring to FIG. 5) to the first signal line SL1. Also, a fourth image signal Sig4 is supplied to the second signal line SL2.

The second image signal Sig2 and the fourth image signal Sig4 have the second polarity when the potential of the common electrode CL is used as the reference. The second polarity is the reverse polarity of the first polarity. In the example, the second polarity is negative ("−"). For example, the first polarity and the second polarity are interchanged every frame period.

For example, for one frame, the first image signal Sig1 having the positive polarity is supplied to the blue pixels (the first pixel electrodes Px1) corresponding to the first group GP1 in the first operation OP1. In the second operation OP2 after the first operation OP1, the second image signal Sig2 having the negative polarity is supplied to the blue pixels (the second pixel electrodes Px2) corresponding to the second group GP2.

Thus, in the embodiment, the polarities of the signals supplied to the signal lines SL corresponding to blue are inverted between the first operation OP1 and the second operation OP2. Thereby, the nonuniformity of the display described below is suppressed; and a high-quality display can be obtained.

On the other hand, as shown in FIG. 6, the following operation is implemented for the green pixels adjacent to the blue pixels.

In the first operation OP1, the controller 60 sequentially selects the multiple gate lines GL included in the first group GP1 (referring to FIG. 2) and supplies a fifth image signal Sig5 to the third signal line SL3. Also, a seventh image signal Sig7 is supplied to the fourth signal line SL4. The fifth image signal Sig5 has the first polarity when the potential of the common electrode CL is used as the reference. The seventh image signal Sig7 has the second polarity when the potential of the common electrode CL is used as the reference.

In the second operation OP2, the controller 60 sequentially selects the multiple gate lines GL included in the second group GP2 (referring to FIG. 2) and supplies a sixth image signal Sig6 to the third signal line SL3. Also, an eighth image signal Sig8 is supplied to the fourth signal line SL4. The sixth image signal Sig6 has the first polarity when the potential of the common electrode CL is used as the reference. The eighth image signal Sig8 has the second polarity when the potential of the common electrode CL is used as the reference.

For example, for one frame, the fifth image signal Sig5 having the positive polarity is supplied to the green pixels (the fifth pixel electrodes Px5) corresponding to the first group GP1 in the first operation OP1. In the second operation OP2, the sixth image signal Sig6 having the positive polarity is supplied to the green pixels (the sixth pixel electrodes Px6) corresponding to the second group GP2. Thus, the polarities of the signals supplied to the signal lines SL corresponding to green are the same between the first operation OP1 and the second operation OP2.

As shown in FIG. 6, the following operation is implemented for the red pixels that are adjacent to the blue pixels.

In the first operation OP1, the controller 60 sequentially selects the multiple gate lines GL included in the first group GP1 (referring to FIG. 2) and supplies a ninth image signal Sig9 to the fifth signal line SL5. For example, the ninth image signal Sig9 has the second polarity when the potential of the common electrode CL is used as the reference.

In the second operation OP2, the controller 60 sequentially selects the multiple gate lines GL included in the second group GP2 (referring to FIG. 2) and supplies a tenth image signal Sig10 to the fifth signal line SL5. For example, the tenth image signal Sig10 has the second polarity when the potential of the common electrode CL is used as the reference.

For example, for one frame, the ninth image signal Sig9 having the negative polarity is supplied to the red pixels (the ninth pixel electrodes Px9) corresponding to the first group GP1 in the first operation OP1. In the second operation OP2, the tenth image signal Sig10 having the negative polarity is supplied to the red pixels (the tenth pixel electrodes Px10) corresponding to the second group GP2. Thus, the polarities of the signals supplied to the signal lines SL corresponding to red are the same between the first operation OP1 and the second operation OP2.

In the example, image signals having mutually-different polarities are supplied to the signal line (e.g., the third signal line SL3) corresponding to the green pixels and the signal line (e.g., the fifth signal line SL5) corresponding to the red pixels adjacent to the signal line corresponding to the green pixels.

In the display device 110 according to the embodiment, image signals having mutually-different polarities are supplied to two most proximal signal lines (e.g., the third signal line SL3 and the fourth signal line SL4) of the multiple signal lines corresponding to the red pixels. For example, for the red pixels, the polarity of the image signal changes every column along the X-axis direction.

Similarly, image signals having mutually-different polarities are supplied to two most proximal signal lines of the multiple signal lines corresponding to the green pixels. For example, for the green pixels as well, the polarity of the image signal changes every column.

On the other hand, the multiple signal lines corresponding to the blue pixels include signal lines of the multiple signal lines corresponding to the blue pixels most proximal to each other to which image signals having the same polarity are supplied. For example, in the first operation OP1, the polarity of the image signal supplied to the first signal line SL1 is the same as the polarity of the image signal supplied to the second signal line SL2. For example, for the blue pixels, the polarity of the image signal changes every two columns along the X-axis direction. However, the polarity may change every three columns or every four columns.

Thus, the multiple signal lines corresponding to the blue pixels are inverted, for example, every two columns. Thereby, the nonuniformity of the display described below is suppressed; and a high-quality display can be obtained.

For example, the uniformity of the display may decrease in the case where the openings G3 are provided in the display device. Conversely, in the display device according to the embodiment, the nonuniformity of the display can be suppressed by the operations described above.

Examples of the nonuniformity of the display occurring in display devices of reference examples will now be described.

Figure 7A:
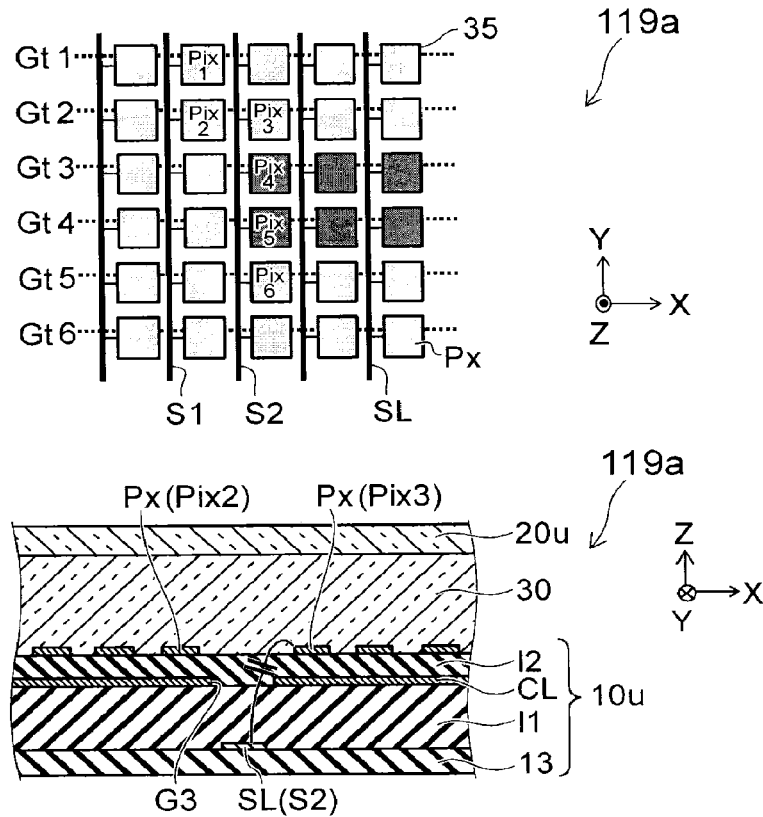
FIG. 7A to FIG. 7C are schematic views showing operations of a display device of a reference example.
Figure 7B:
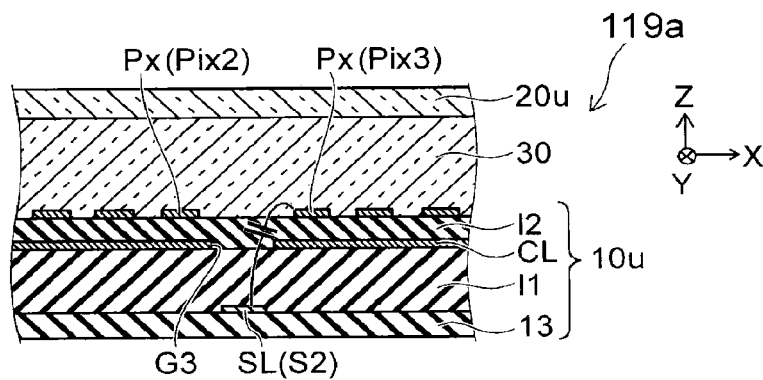
Figure 7C:
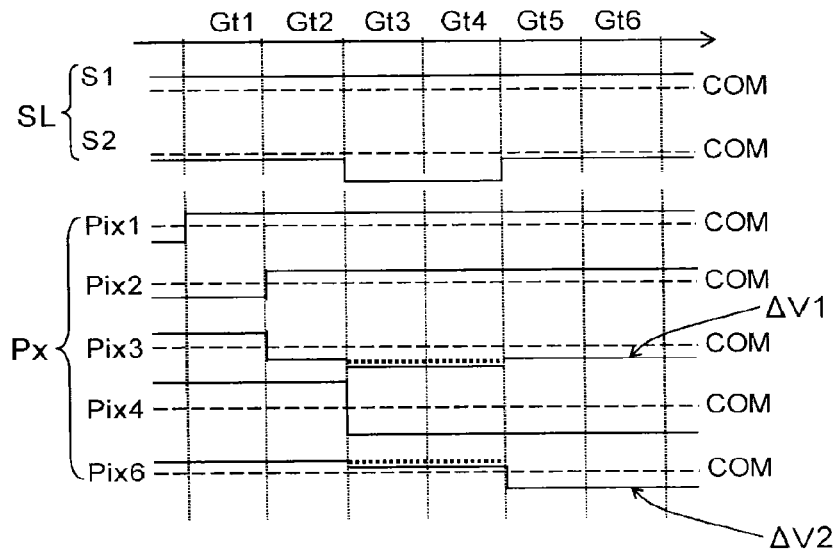

FIG. 7A to FIG. 7C are schematic views showing operations of a display device of a reference example.

FIG. 7A to FIG. 7C show the display device 119a of the reference example.

The first substrate unit 10u, the second substrate unit 20u, etc., are provided in the display device 119a as well. A configuration similar to the configuration described in regard to the display device 110 is applicable to the configuration of the display device 119a. The operations of the display device 119a are different from the operations of the display device 110.

For each of the multiple signal lines SL in the display device 119a, the polarities of the image signals that are supplied in the first operation OP1 are the same as the polarities of the image signals that are supplied in the second operation OP2.

FIG. 7A shows the nonuniformity of the display occurring in the display device 119a. FIG. 7B is a cross-sectional view of a region of a portion of the display device 119a. FIG. 7C shows the potentials of the display device 119a.

As shown in FIG. 7A, first to sixth gate lines Gt1 to Gt6 and the multiple signal lines SL are provided. An example will now be described in which signals having the positive polarity are written to the pixel electrodes Px by column inversion driving. The switch elements 11 are not shown in FIG. 7A. A signal line S1 and a signal line S2 of the signal lines SL are focused upon.

As shown in FIG. 7A, a pixel electrode Pix1 is provided at the intersecting position between the first gate line Gt1 and the signal line S1. A pixel electrode Pix2 is provided at the intersecting position between the second gate line Gt2 and the signal line S1. A pixel electrode Pix3 is provided at the intersecting position between the second gate line Gt2 and the signal line S2. A pixel electrode Pix4 is provided at the intersecting position between the third gate line Gt3 and the signal line S2. A pixel electrode Pixy is provided at the intersecting position between the fourth gate line Gt4 and the signal line S2. A pixel electrode Pix6 is provided at the intersecting position between the fifth gate line Gt5 and the signal line S2.

In the example as shown in FIG. 7B, the opening G3 of the common electrode CL is disposed in the region between the pixel electrode Pix2 and the pixel electrode Pix3. The opening G3 and the signal line SL (in the example, the signal line S2) overlap when projected onto the X-Y plane.

As shown in FIG. 7A, a signal for the display having the same gradation (a first gradation) is supplied to the pixel electrodes Px corresponding to the signal line S1. As shown in FIG. 7B, the signal for the display having the first gradation is supplied to the pixel electrode Pix3 and the pixel electrode Pix6. The signal for the display having the second gradation is supplied to the pixel electrode Pix4 and the pixel electrode Pixy. For example, the magnitude of the signal for the display having the second gradation is greater than the magnitude of the signal for the display having the first gradation. A dark display (normally dark) is performed when the potential difference between the pixel electrode Px and the common electrode CL is small. The brightness of the second gradation is brighter than the brightness of the first gradation.

When such a display is performed, for example, it was found that there are cases where the brightness of the pixel 35 corresponding to the pixel electrode Pix3 is brighter than the brightness (the first gradation) that should be displayed; and the brightness of the pixel 35 corresponding to the pixel electrode Pix6 is darker than the brightness (the first gradation) that should be displayed. In other words, a nonuniformity of the display occurs. In other words, vertical crosstalk occurs.

According to the investigations of the inventor, it is inferred that capacitance is created between the pixel electrodes Px and the signal lines SL; and the nonuniformity is caused by the potentials of the pixel electrodes Px fluctuating due to the capacitance.

FIG. 7C shows the potentials of the signal lines SL and the potentials of the pixel electrodes Px. The horizontal axis of FIG. 7C is time. A common potential COM of the common electrode CL is displayed in FIG. 7C.

As shown in FIG. 7C, the potential of the signal line S1 corresponds to the first gradation. On the other hand, the potential of the signal line S2 is a potential corresponding to the second gradation (a potential higher than the first gradation) when the third gate line Gt3 and the fourth gate line Gt4 are selected. Because of the state of the column inversion driving, the polarities are inverted between the signal line S1 and the signal line S2.

As shown in FIG. 7C, the pixel electrodes Pix1 and Pix2 are set to the desired potentials. Conversely, after the desired potential of the first gradation is written to the pixel electrode Pix3, the potential fluctuates to become a potential that is lower than the prescribed potential (the potential of the second gradation) in the interval in which the third gate line Gt3 and the fourth gate line Gt4 are selected. It is considered that this is caused by the potential of the pixel electrode Pix3 fluctuating to be lower (more distal to the potential of the common electrode) due to the coupling between the pixel electrode Pix3 and the signal line S2. In other words, potential fluctuation ΔV1 occurs at the pixel electrode Pix3. Therefore, it is considered that the pixel that corresponds to the pixel electrode Pix3 is brighter than the desired brightness.

Conversely, at the pixel electrode Pix6 as shown in FIG. 7C, the potential of the pixel electrode Pix6 fluctuates (is pulled toward the negative potential side of the pixel electrodes Pix4 and Pix5) by the coupling of the pixel electrodes Pix4 and Pix5 with the signal line S2 when the signal that should be supplied is supplied to the pixel electrode Pix6. Therefore, potential fluctuation ΔV2 occurs at the pixel electrode Pix6. The potential fluctuation ΔV2 is potential fluctuation in the reverse direction of the potential fluctuation ΔV1. Therefore, it is considered that the pixel electrode Pix6 is darker than the desired brightness.

Thus, in the display device 119a, the potentials (the temporal average of the potentials) of the pixel electrodes Px fluctuate due to the capacitive coupling created between the pixel electrodes Px and the signal lines SL; and as a result, the nonuniformity of the display occurs. As shown in FIG. 7B, the capacitance occurs mainly in locations where the opening G3 of the common electrode CL is provided. In other words, the nonuniformity of the display caused by the capacitance occurs uniquely in the case where the opening G3 is provided for the group including the multiple signal lines SL.

Moreover, in the display device 119a, it was found that the nonuniformity of the display also occurs due to the capacitance occurring between the pixel electrodes Px and the common electrode CL.

For example, an electric field E is generated by the signal line SL at the position of the opening G3 of the common electrode CL. There are cases where the nonuniformity of the display occurs due to the electric field.

It may be considered to attempt suppressing such a nonuniformity of the display by, for example, using dot inversion driving or line inversion driving. However, the power consumption increases for these methods.

In the display device 110 according to the embodiment, the polarity of the signal supplied to the signal line is changed between the first operation OP1 and the second operation OP2 according to the position where the opening G3 is provided. In the example, the polarity of the signal supplied to the first signal line SL1 is changed. Thereby, for example, the potential of the first signal line SL1 is averaged inside one frame. Thereby, the nonuniformity of the display is suppressed; and a high-quality display can be provided.

Figure 8:
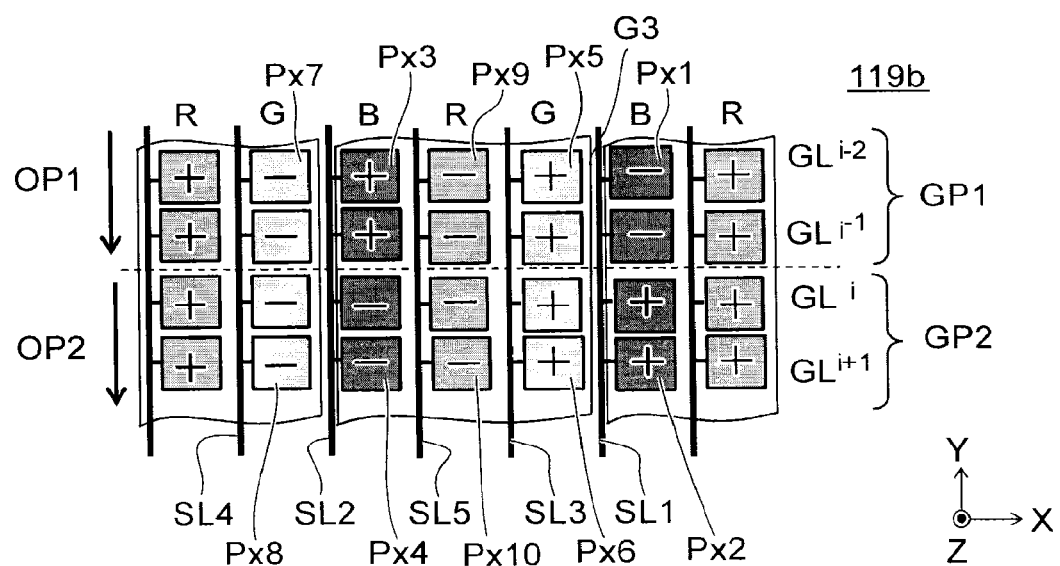
FIG. 8 is a schematic view showing operations of a display device of a reference example.

FIG. 8 is a schematic view showing operations of a display device of a reference example.

FIG. 8 shows the display device 119b of the reference example. The first substrate unit 10u, the second substrate unit 20u, etc., are provided in the display device 119b as well. A configuration similar to the configuration described in regard to the display device 110 is applicable to the configuration of the display device 119b. The operations of the display device 119b are different from the operations of the display device 110.

For example, the polarities of the image signals supplied to each of the second to fifth signal lines SL2 to SL5 in the first operation OP1 of the display device 119b are similar to those of the first operation OP1 of the display device 110. Also, for example, the polarities of the image signals supplied to each of the second to fifth signal lines SL2 to SL5 in the second operation OP2 of the display device 119b are similar to those of the second operation OP2 of the display device 110. For the blue pixels, the polarities of the image signals that are supplied are changed between the first operation OP1 and the second operation OP2.

For example, in the first operation OP1 of the display device 119b, the polarity of the image signal supplied to the first signal line SL1 is the second polarity. For example, in the second operation OP2 of the display device 119b, the polarity of the image signal supplied to the first signal line SL1 is the first polarity. Thus, for the polarities of the signals supplied to the signal lines corresponding to the blue pixels, the operation of the display device 119b is different from the operation of the display device 110. In the display device 119b, for the signal lines corresponding to blue, the polarities of the signals that are supplied are different between the signal lines adjacent to each other in the X-axis direction. In other words, for example, the polarities of the signals supplied to the signal lines corresponding to the blue pixels change every column along the X-axis direction.

There are cases where the uniformity of the display decreases in the operations of such a display device 119b. For example, as shown in FIG. 8, the polarity of the image signal of the first pixel electrodes Px1 is negative. The polarity of the image signal of the fifth pixel electrodes Px5 is positive. The polarity of the image signal of the ninth pixel electrodes Px9 is negative. Thus, the polarities of the signals supplied to the pixel electrodes connected to the gate lines GL included in the first group GP1 change every column along the X-axis direction.

On the other hand, as shown in FIG. 8, for example, the polarity of the image signal of the tenth pixel electrodes Px10 is negative. The polarity of the image signal of the fourth pixel electrodes Px4 is negative. The polarity of the image signal of the eighth pixel electrodes also is negative. Thus, the polarities of the signals supplied to the pixel electrodes connected to the gate lines GL included in the second group GP2 changes every three columns along the X-axis direction.

Thus, in the display device 119b, a block occurs in which the polarities of the signals invert every column; and a block occurs in which the polarities of the signals invert every three columns. Thus, for example, due to the bias occurring in the polarities of the signals, an unevenness by block unit is viewed; and the uniformity of the display decreases.

Conversely, in the display device 110 according to the embodiment, for example, the polarities of the signals supplied to the signal lines corresponding to the blue pixels change every two columns along the X-axis direction (invert at a period of two columns). In other words, for example, the polarity of the signal of the first signal line SL1 is the same as the polarity of the signal of the second signal line SL2. Thereby, the bias of the polarities of the signals can be suppressed; the nonuniformity of the display is suppressed; and a high-quality display is obtained.

Figure 9:
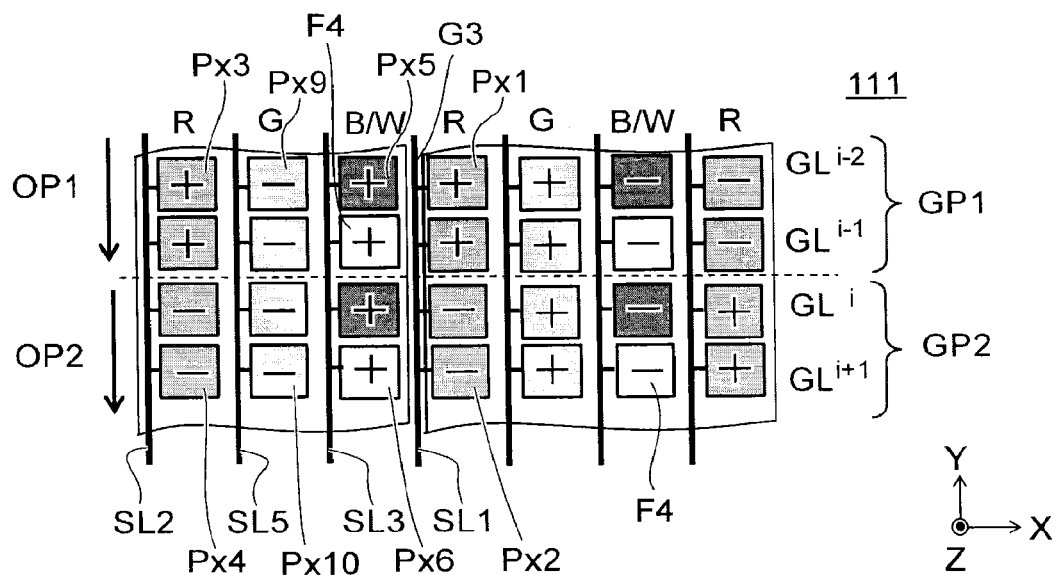
FIG. 9 is a schematic view showing the operations of the display device according to the first embodiment.

FIG. 9 is a schematic view showing the operations of the display device according to the first embodiment.

FIG. 9 shows the polarities of the signals of a display device 111.

In the display device 111 shown in FIG. 9, for example, the first color is red; the second color is blue; and the third color is green. The colored layer 25 further includes multiple fourth color filters F4 of a fourth color. The fourth color is different from the first color, the second color, and the third color. For example, the fourth color is white (W). A configuration similar to that of the display device 110 is applicable to the display device 111.

In the example, at least a portion of the second color filters F2 (the blue filters) and a portion of the multiple fifth pixel electrodes Px5 overlap when projected onto the X-Y plane. At least a portion of the fourth color filters F4 (the white filters) and the pixel electrodes Px arranged in the Y-axis direction with the multiple fifth pixel electrodes Px5 overlap. For example, the blue pixels (the pixel electrodes overlapping the second color filters F2) and the white pixels (the pixel electrodes overlapping the fourth color filters F4) are disposed alternately along the Y-axis direction. Thus, the multiple fourth color filters F4 may be provided in the embodiment. In the embodiment, the arrangement of the multiple fourth color filters F4 is modifiable as appropriate. For example, the green pixels and the white pixels may be disposed alternately along the Y-axis direction.

In the display device 111 as well, the polarities of the image signals supplied to the signal lines corresponding to the first color are changed between the first operation OP1 and the second operation OP2. Thereby, the nonuniformity of the display is suppressed.

For the multiple signal lines corresponding to the first color, the polarities of the signals that are supplied invert every two columns along the X-axis direction. For the multiple signal lines corresponding to the second color, the polarities of the signals that are supplied invert every column along the X-axis direction. Thereby, the bias of the polarities of the signals is suppressed; and the nonuniformity of the display is suppressed.

Figure 10:
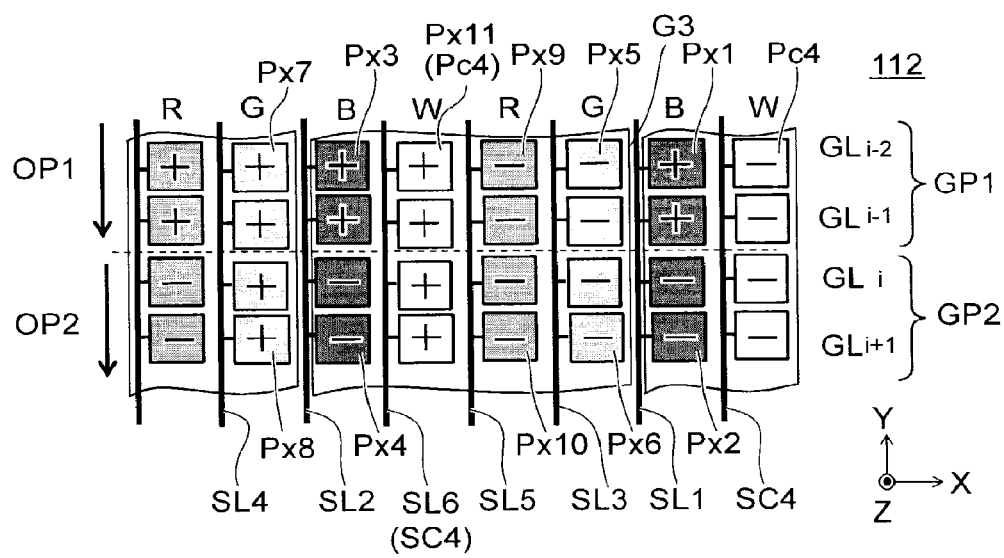
FIG. 10 is a schematic view showing the operations of the display device according to the first embodiment.

FIG. 10 is a schematic view showing the operations of the display device according to the first embodiment.

FIG. 10 shows the polarities of the signals of a display device 112. The fourth color filters F4 are provided in the display device 112 as well. In the example, the first color filters F1 are blue; and the fourth color filters F4 are white. A configuration similar to that of the display device 110 is applicable to the display device 112.

In the display device 112, the multiple pixel electrodes Px include multiple fourth color electrodes Pc4 so that the multiple fourth color electrodes Pc4 and one of the multiple fourth color filters F4 overlap when projected onto the X-Y plane. The multiple signal lines SL include multiple fourth color interconnects SC4. Each of the multiple fourth color interconnects SC4 is electrically connected to one of the multiple fourth color electrodes Pc4 via one of the multiple switch elements 11.

The multiple fourth color interconnects SC4 include a sixth signal line SL6. The sixth signal line SL6 is provided between the first signal line SL1 and the second signal line SL2. In the example, the sixth signal line SL6 is provided between the second signal line SL2 and the fifth signal line SL5. The sixth signal line SL6 corresponds to the fourth color.

For example, the signal lines that correspond to white are provided respectively in the regions between the multiple signal lines corresponding to blue. In the example, the signal lines that correspond to white are provided respectively in the regions between the signal lines corresponding to blue and the signal lines corresponding to red. For example, the signal lines that correspond to white may be provided between the signal lines corresponding to red and the signal lines corresponding to green. In the embodiment, various modifications are possible for the arrangement of the signal lines corresponding to white.

The multiple switch elements 11 further include multiple eleventh switches SW11. The multiple eleventh switches SW11 are electrically connected respectively to the multiple gate lines GL included in the first group GP1; and each of the multiple eleventh switches SW11 is electrically connected to the sixth signal line SL6.

The multiple fourth color electrodes Pc4 further include multiple eleventh pixel electrodes Px11. The multiple eleventh pixel electrodes Px11 are electrically connected respectively to the multiple eleventh switches SW11.

For example, in the first operation OP1, the controller 60 sequentially selects the multiple gate lines GL included in the first group GP1 and supplies an eleventh image signal Sig11 to the sixth signal line SL6. For example, the eleventh image signal Sig11 has the first polarity when the potential of the common electrode CL is used as the reference.

In the second operation OP2, the controller 60 sequentially selects the multiple gate lines GL included in the second group GP2 and supplies an image signal having the first polarity having the potential of the common electrode CL as the reference to the sixth signal line SL6.

In the display device 112 as well, the polarities of the image signals supplied to the signal lines corresponding to the first color are changed between the first operation OP1 and the second operation OP2. Thereby, the nonuniformity of the display is suppressed.

For the multiple signal lines corresponding to the first color, the polarities of the signals that are supplied invert every two columns along the X-axis direction. For the multiple signal lines corresponding to the second color, the polarities of the signals that are supplied invert every column along the X-axis direction. Thereby, the bias of the polarities of the signals is suppressed; and the nonuniformity of the display is suppressed. A high-quality display can be obtained.

Second Embodiment

Figure 11A:
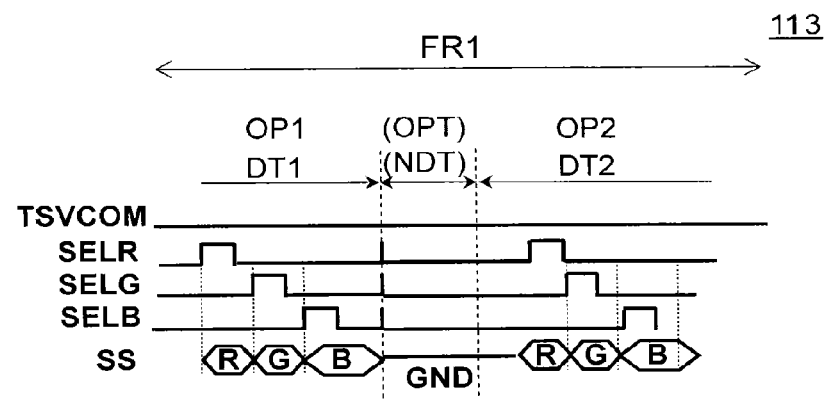
FIG. 11A and FIG. 11B are schematic views showing the operations of a display device according to a second embodiment.
Figure 11B:
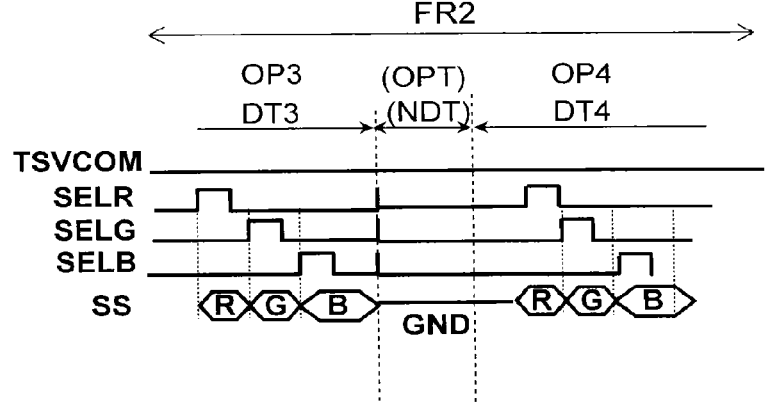

FIG. 11A and FIG. 11B are schematic views showing the operations of a display device according to a second embodiment.

FIG. 11A and FIG. 11B are time charts showing the operations of the display device 113. The horizontal axis is time. A configuration similar to the configuration described in regard to the display device 110 is applicable to the configuration of the display device 113.

FIG. 11A shows the operations of a first frame FR1 of the display device 113. FIG. 11B shows the operations of a second frame FR2 of the display device 113. The second frame FR2 is the next frame after the first frame FR1.

As shown in FIG. 11A, the controller 60 of the display device 113 implements the first operation OP1 and the second operation OP2 in the interval of displaying the first frame FR1. The first operation OP1 and the second operation OP2 are similar to the operations described in regard to the display device 110.

As shown in FIG. 11A, in the first display interval DT1 of the interval of displaying the first frame FR1, the controller 60 of the display device 113 implements the first operation OP1; and the display at the pixels 35 corresponding to the first group GP1 is performed.

In the second display interval DT2 of the interval of displaying the first frame FR1, the controller 60 implements the second operation OP2; and the display at the pixels 35 corresponding to the second group GP2 is performed.

As shown in FIG. 11B, in a third display interval DT3 of the interval of displaying the second frame FR2, the controller 60 of the display device 113 implements a third operation OP3; and the display at the pixels 35 corresponding to the first group GP1 is performed.

In a fourth display interval DT4 of the interval of displaying the second frame FR2, the controller 60 implements a fourth operation OP4; and the display at the pixels 35 corresponding to the second group GP2 is performed.

FIG. 12A to FIG. 12D are schematic views showing the operations of the display device according to the second embodiment.

Figure 12A:
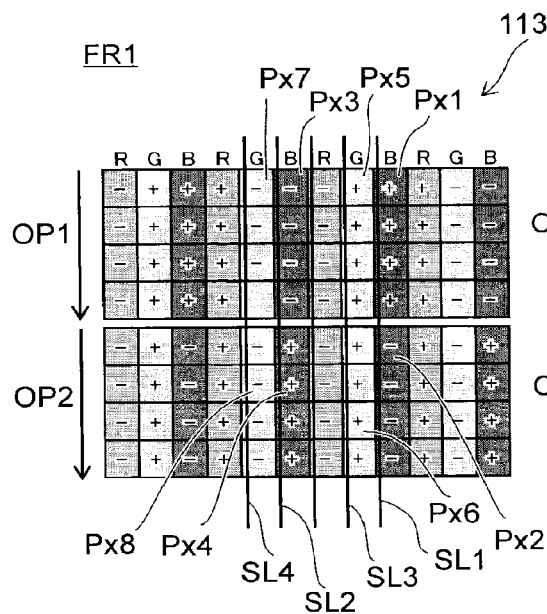
FIG. 12A to FIG. 12D are schematic views showing the operations of the display device according to the second embodiment.

FIG. 12A shows the operations of the first frame FR1 of the display device 113.

As shown in FIG. 12A, in the first operation OP1, the controller 60 sequentially selects the multiple gate lines GL included in the first group GP1, supplies the first image signal Sig1 (the first signal) having the first polarity to the first signal line SL1, and supplies the fifth image signal Sig5 (the fifth signal) having the first polarity to the third signal line SL3. In the example, the first polarity is positive; and the second polarity is negative.

In the second operation OP2, the controller 60 sequentially selects the multiple gate lines GL included in the second group GP2, supplies the second image signal Sig2 (the second signal) having the second polarity to the first signal line SL1, and supplies the sixth image signal Sig6 (the sixth signal) having the first polarity to the third signal line SL3.

Figure 12B:
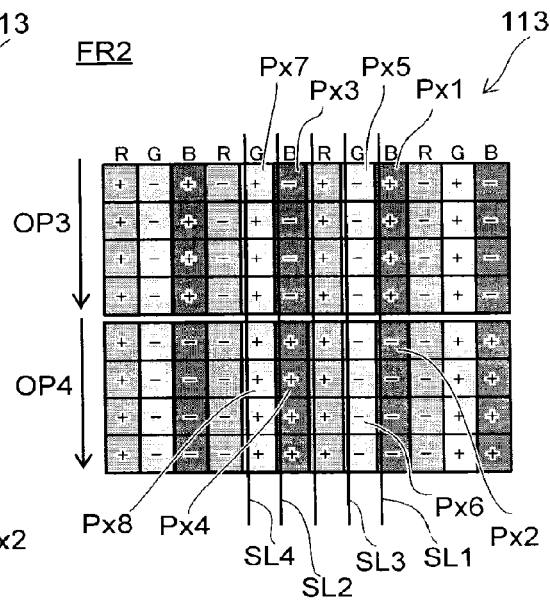

FIG. 12B shows the operations of the second frame FR2 of the display device 113. As shown in FIG. 12B, in the third operation OP3, the controller 60 sequentially selects the multiple gate lines GL included in the first group GP1, supplies the first image signal Sig1 (the third signal) having the first polarity to the first signal line SL1, and supplies the fifth image signal Sig5 (the seventh signal) having the second polarity to the third signal line SL3.

In the fourth operation OP4, the controller 60 sequentially selects the multiple gate lines GL included in the second group GP2, supplies the second image signal Sig2 (the fourth signal) having the second polarity to the first signal line SL1, and supplies the sixth image signal Sig6 (the eighth signal) having the second polarity to the third signal line SL3.

Thus, in the display device 113 as well, the polarities of the image signals supplied to the signal lines corresponding to blue change between the first operation OP1 and the second operation OP2. The polarities of the image signals supplied to the signal lines corresponding to blue change between the third operation OP3 and the fourth operation OP4.

The polarities of the image signals supplied to the signal line (the first signal line SL1) corresponding to blue are the same between the first frame FR1 and the second frame FR2. In other words, for example, the polarities of the image signals supplied to the signal lines corresponding to blue invert every two frames (at a first inversion period). In the example, the first inversion period is two frames. The first inversion period may be two or more frames.

The polarities of the image signals supplied to the signal line (the third signal line SL3) corresponding to green are different between the first frame FR1 and the second frame FR2. In other words, for example, the polarities of the image signals supplied to the signal lines corresponding to green invert every frame (at a second inversion period). In the example, the second inversion period is one frame. The second inversion period is different from the first inversion period.

Thus, the temporal period of the inversion of the polarities of the image signals supplied to the signal lines corresponding to the first color is different from the temporal period of the inversion of the polarities of the image signals supplied to the signal lines corresponding to the second color. Thereby, the bias of the polarities of the image signals is temporally suppressed (averaged).

For example, focusing on the pixel electrodes to which the image signals are supplied to the first operation OP1, as shown in FIG. 12A, the pixel electrodes to which the positive signals are supplied and the pixel electrodes to which the negative signals are supplied are arranged alternately three at a time along the X-axis direction. On the other hand, in the third operation OP3 of the next frame as shown in FIG. 12B, the pixel electrodes to which the positive signals are supplied and the pixel electrodes to which the negative signals are supplied are arranged alternately one at a time along the X-axis direction. In the second frame FR2, the bias of the polarities of the image signals is suppressed. Thus, the bias of the polarities of the image signals is temporally suppressed. The nonuniformity of the display is suppressed; and a high-quality display is obtained.

Figure 12C:
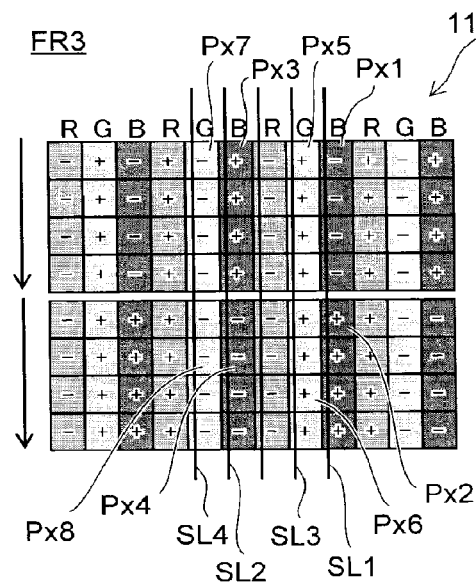

FIG. 12C shows the operations of a third frame FR3 of the display device 113. The third frame FR3 is the next frame after the second frame FR2. As shown in FIG. 12C, the polarity of the image signal supplied to the first signal line SL1 in the third frame FR3 is different from the polarity of the image signal supplied to the first signal line SL1 in the second frame FR2. The polarity of the image signal supplied to the third signal line SL3 in the third frame FR3 is different from the polarity of the image signal supplied to the third signal line SL3 in the second frame FR2.

Figure 12D:
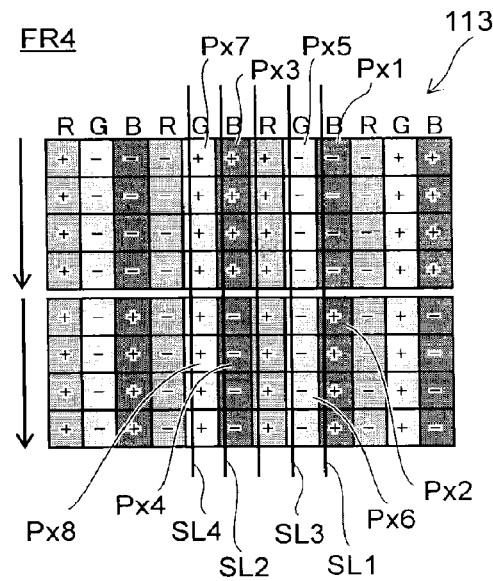

FIG. 12D shows the operations of a fourth frame FR4 of the display device 113. The fourth frame FR4 is the next frame after the third frame FR3. As shown in FIG. 12D, the polarity of the image signal supplied to the first signal line SL1 in the fourth frame FR4 is the same as the polarity of the signal supplied to the first signal line SL1 in the third frame FR3. The polarity of the image signal supplied to the third signal line SL3 in the fourth frame FR4 is different from the polarity of the image signal supplied to the third signal line SL3 in the third frame FR3.

In the example, image signals having polarities similar to the polarities illustrated for the first to fourth frames FR1 to FR4 are repeatedly supplied to the signal lines SL by the controller 60. Thereby, the bias of the polarities of the image signals is temporally suppressed; and the nonuniformity of the display is suppressed.

FIG. 13A to FIG. 13H are schematic views showing the operations of the display device according to the second embodiment.

FIG. 13A to FIG. 13H respectively show the operations of a display device 114 for the first to eighth frames FR1 to FR8. The first to eighth frames FR1 to FR8 are continuous in this order in the operations of the display device.

A configuration similar to the configuration described in regard to the display device 110 is applicable to the display device 114. In the display device 114, the multiple gate lines GL further include a third group GP3. The third group GP3 is a portion other than the portion of the multiple gate lines GL included in the first group GP1 and the portion of the multiple gate lines GL included in the second group GP2. In the example, the third group GP3 is adjacent to the first group GP1 in the Y-axis direction. The first group GP1 is provided between the second group GP2 and the third group GP3.

The multiple switch elements 11 further include multiple twelfth switches SW12. The multiple twelfth switches SW12 are electrically connected respectively to the multiple gate lines GL included in the third group GP3; and each of the multiple twelfth switches SW12 is electrically connected to the first signal line SL1.

The multiple first color electrodes Pc1 further include multiple twelfth pixel electrodes Px12. The multiple twelfth pixel electrodes Px12 are electrically connected respectively to the multiple twelfth switches SW12. A portion of the common electrode CL and at least a portion of the multiple twelfth pixel electrodes Px12 overlap when projected onto the X-Y plane.

Figure 13A:
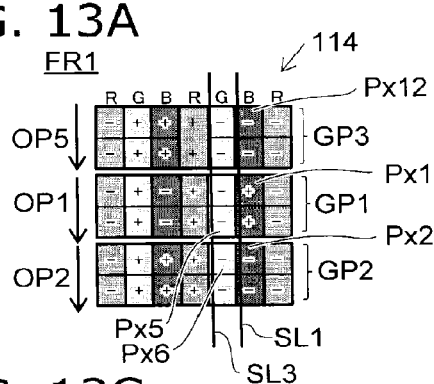
FIG. 13A to FIG. 13H are schematic views showing the operations of the display device according to the second embodiment.

As shown in FIG. 13A, the display device 114 performs the first operation OP1 and the second operation OP2. The first operation OP1 and the second operation OP2 in the display device 114 are similar to the first operation OP1 and the second operation OP2 described in regard to the display device 113.

The first frame FR1 includes a fifth display interval DT5. The fifth display interval DT5 is different from the first display interval DT1 and the second display interval DT2. In the example, the fifth display interval DT5 is the interval prior to the first display interval DT1.

In the fifth display interval DT5, the controller 60 performs a fifth operation OP5. In the fifth operation OP5, the controller 60 sequentially selects the multiple gate lines GL included in the third group GP3 and supplies a twelfth image signal Sig12 (the ninth signal) having the second polarity having the potential of the common electrode CL as the reference to the first signal line SL1.

Figure 13B:
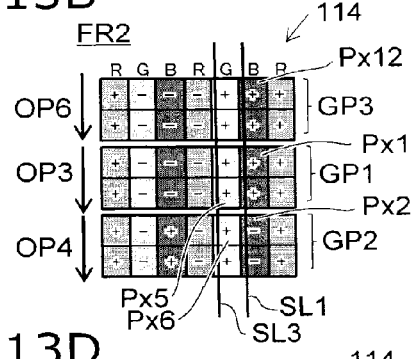

As shown in FIG. 13B, the display device 114 performs the third operation OP3 and the fourth operation OP4. The third operation OP3 and the fourth operation OP4 in the display device 114 are similar to the third operation OP3 and the fourth operation OP4 described in regard to the display device 113.

The second frame FR2 includes a sixth display interval DT6. The sixth display interval DT6 is different from the third display interval DT3 and the fourth display interval DT4. In the example, the sixth display interval DT6 is the interval prior to the third display interval DT3.

In the sixth display interval DT6, the controller 60 performs a sixth operation OP6. In the sixth operation OP6, the controller 60 sequentially selects the multiple gate lines GL included in the third group GP3 and supplies the twelfth image signal Sig12 (the tenth signal) having the first polarity having the potential of the common electrode CL as the reference to the first signal line SL1.

Thus, for the twelfth pixel electrodes Px12, the polarities of the image signals supplied to the first frame FR1 are different from the polarities of the image signals supplied to the second frame FR2. On the other hand, as described above, for example, for the first pixel electrodes Px1 or the second pixel electrodes Px2, the polarities of the image signals supplied in the first frame FR1 are the same as the polarities of the image signals supplied in the second frame FR2.

Thus, for example, pixel electrodes for which the supplied signals have the same polarities between the first frame FR1 and the following second frame FR2 are provided; and pixel electrodes for which the supplied signals have inverted polarities between the first frame FR1 and the following second frame FR2 are provided. Thereby, the average of the time until the polarities are inverted is reduced. For example, the effects of flicker noise, etc., can be reduced; and a high-quality display can be obtained.

In the embodiment, the first to twelfth image signals Sig1 to Sig12 are supplied respectively to the first to twelfth pixel electrodes Px1 to Px12. For example, the value of the first image signal Sig1 in the first frame FR1 may be different from the value of the first image signal Sig1 in the second frame FR2.

Figure 13C:
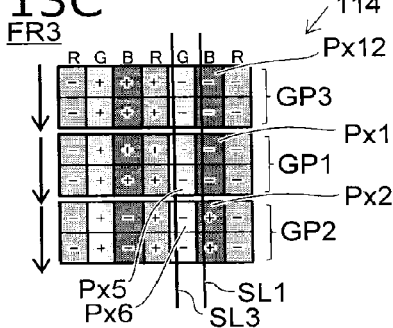
Figure 13D:
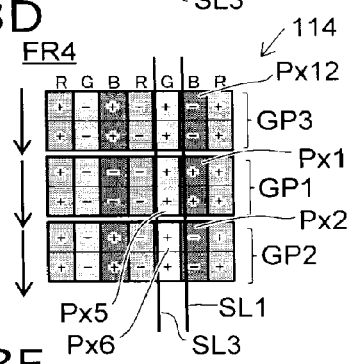

As shown in FIG. 13C and FIG. 13D, the polarities of the image signals supplied to the first pixel electrodes Px1 and the second pixel electrodes Px2 invert between the third frame FR3 and the fourth frame FR4. On the other hand, the polarities of the image signals supplied to the twelfth pixel electrodes Px12 do not invert.

Figure 13E:
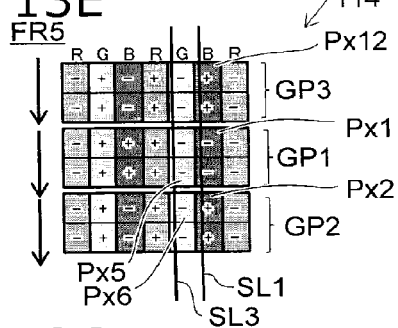
Figure 13F:
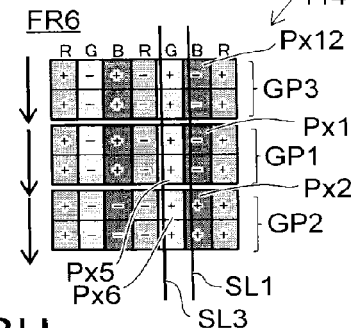

As shown in FIG. 13E and FIG. 13F, the polarities of the image signals supplied to the first pixel electrodes Px1 and the second pixel electrodes Px2 do not invert between a fifth frame FR5 and a sixth frame FR6. On the other hand, the polarities of the image signals supplied to the twelfth pixel electrodes Px12 invert.

Figure 13G:
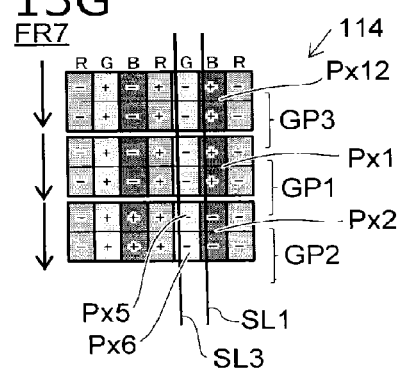
Figure 13H:
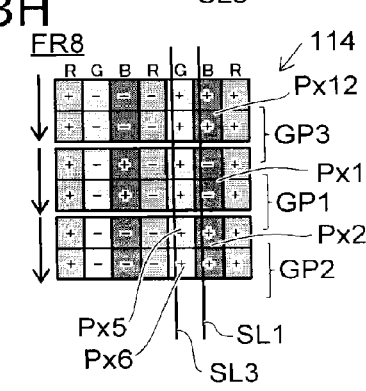

As shown in FIG. 13G and FIG. 13H, the polarities of the image signals supplied to the first pixel electrodes Px1 and the second pixel electrodes Px2 invert between a seventh frame FR7 and the eighth frame FR8. On the other hand, the polarities of the image signals supplied to the twelfth pixel electrodes Px12 do not invert.

Thus, the pixel electrodes for which the supplied polarities of the image signals invert between one frame and the next frame are sequentially interchanged (rotated) with the pixel electrodes for which the supplied polarities of the image signals do not invert between the one frame and the next frame. In the example, the interchange is performed every two frames. Thereby, for one pixel electrode, the average of the time until the polarity is inverted is reduced. However, in the embodiment, the period at which the interchange is performed is not limited to two frames.

In the display device 114, the bias of the polarities of the image signals is suppressed; and the effects of flicker noise, etc., can be reduced. A high-quality display can be obtained.

Third Embodiment

Figure 14:
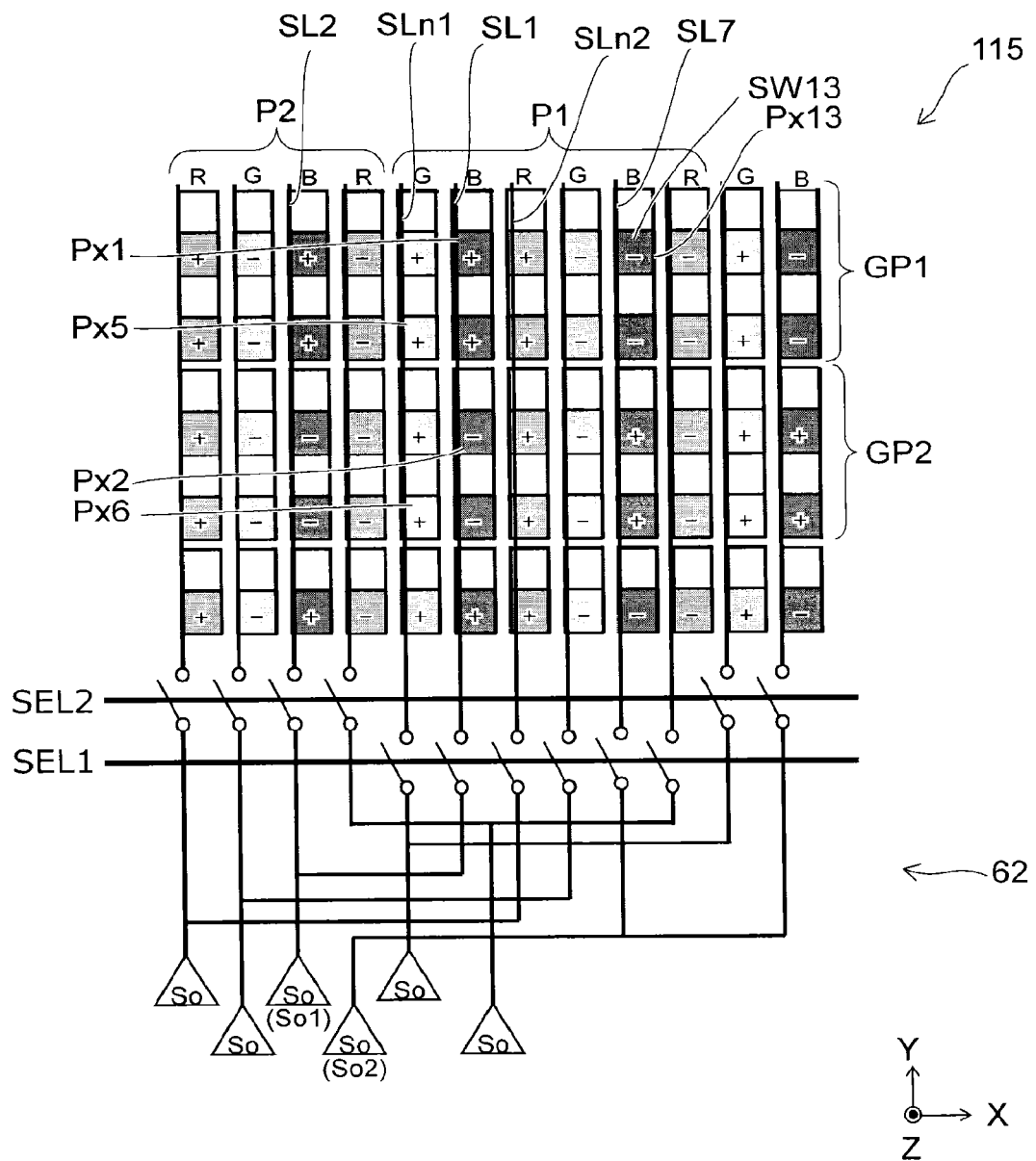
FIG. 14 is a schematic view showing a display device according to a third embodiment.

FIG. 14 is a schematic view showing a display device according to a third embodiment.

FIG. 14 shows the display device 115. A configuration similar to the configuration described in regard to the display device 110 is applicable to the display device 115. In the display device 115, similarly to the description of the display device 110, the controller 60 performs the first operation OP1 and the second operation OP2.

In the display device 115 as shown in FIG. 14, the multiple signal lines SL include a first portion P1. The first portion P1 includes the first signal line SL1, a first adjacent line SLn1, and a second adjacent line SLn2. The first adjacent line SLn1 is adjacent to the first signal line SL1. The second adjacent line SLn2 is adjacent to the first signal line SL1. The first signal line SL1 is provided between the first adjacent line SLn1 and the second adjacent line SLn2. The first adjacent line SLn1 is, for example, the third signal line SL3. The multiple signal lines SL include a second portion P2 other than the first portion P1.

The drive circuit 62 includes a first selector SEL1 and multiple source amplifiers So. In the example, the drive circuit 62 further includes a second selector SEL2.

The first selector SEL1 is electrically connected to each of the multiple signal lines SL included in the first portion P1. The second selector SEL2 is electrically connected to each of the multiple signal lines SL included in the second portion P2.

Each of the multiple source amplifiers So is electrically connected to the first selector SEL1. Also, each of the multiple source amplifiers So is electrically connected to the second selector SEL2.

For example, the first display interval DT1 includes a first interval T1 and a second interval T2. The second interval T2 is the interval after the first interval T1.

In the first interval T1, the first selector SEL1 electrically connects the multiple signal lines SL included in the first portion P1 respectively to the multiple source amplifiers So. Thereby, in the first interval T1, the multiple source amplifiers So respectively supply the image signals to the multiple signal lines SL included in the first portion P1. For example, in the first interval T1, the controller 60 supplies the first image signal Sig1 to the first signal line SL1, supplies an image signal different from the first image signal Sig1 to the first adjacent line SLn1, and supplies a second adjacent image signal different from the first image signal Sig1 to the second adjacent line SLn2.

In the second interval T2, the second selector SEL2 electrically connects the multiple signal lines SL included in the second portion P2 respectively to the multiple source amplifiers So. Thereby, in the second interval T2, the multiple source amplifiers So respectively supply the image signals to the multiple signal lines SL included in the second portion P2.

In other words, in the first interval T1, the image signals are supplied to the first signal line SL1 and to the signal line adjacent to the first signal line SL1. For example, the image signals are supplied substantially simultaneously to the first signal line SL1 and to the signal line adjacent to the first signal line SL1. Thereby, for example, the nonuniformity of the display can be suppressed.

In the display device 115, for example, the polarities of the image signals supplied to the first pixel electrodes Px1 are the same as the polarities of the image signals supplied to the pixel electrodes Px (e.g., the fifth pixel electrodes Px5) adjacent to the first pixel electrodes Px1 in the X-axis direction. On the other hand, the polarities of the image signals supplied to the second pixel electrodes Px2 are different from the polarities of the image signals supplied to the pixel electrodes Px (e.g., the sixth pixel electrodes Px6) adjacent to the second pixel electrodes Px2 in the X-axis direction. Therefore, in the case where the timing of supplying the image signal to the first signal line SL1 is different from the timing of supplying the image signal to the signal line adjacent to the first signal line SL1, an unevenness of the display may occur due to capacitive coupling between the pixel electrodes connected to the first signal line SL1 and the adjacent signal line. In such a case, for example, the capacitive coupling between the pixel electrodes connected to the first signal line SL1 and the first adjacent line SLn1 in the first operation OP1 is different from the capacitive coupling between the pixel electrodes connected to the first signal line SL1 and the first adjacent line SLn1 in the second operation OP2. Thereby, the unevenness of the display may occur.

Conversely, in the display device 115, for example, the image signals are supplied simultaneously to the first signal line SL1 and to the signal line adjacent to the first signal line SL1. Thereby, for example, the nonuniformity of the display can be suppressed.

For example, in the display operation, the multiple source amplifiers So invert the polarities of the image signals supplied to the signal lines SL by frame. Therefore, for example, the source amplifiers So that are disposed to be adjacent to each other are designed so that signals having mutually-different polarities are supplied to one frame.

The multiple first color interconnects SC1 further include a seventh signal line SL7. The seventh signal line SL7 is separated from the first signal line SL1 in the X-axis direction. In the example, the seventh signal line SL7 is the signal line SL of the multiple signal lines SL corresponding to blue that is adjacent to the first signal line SL1 in the X-axis direction. For the multiple signal lines SL corresponding to blue, the polarities of the image signals that are supplied invert every two columns along the X-axis direction.

The multiple switch elements 11 further include multiple thirteenth switches SW13. The multiple thirteenth switches SW13 are electrically connected respectively to the multiple gate lines GL included in the first group GP1; and each of the multiple thirteenth switches SW13 is electrically connected to the seventh signal line SL7.

The multiple first color electrodes Pc1 further include multiple thirteenth pixel electrodes Px13. The multiple thirteenth pixel electrodes Px13 are electrically connected respectively to the multiple thirteenth switches SW13.

The first operation OP1 includes, in the first display interval DT1, an operation of sequentially selecting the multiple gate lines GL included in the first group GP1 and supplying a thirteenth image signal to the seventh signal line SL7. The polarity of the thirteenth image signal is, for example, the second polarity having the common electrode CL as the reference.

The multiple source amplifiers So include a first source amplifier So1 and a second source amplifier So2. For example, the first selector SEL1 switches the first source amplifier So1 to the state of being electrically connected to the first signal line SL1. The first source amplifier So1 is capable of supplying the image signal to the first signal line SL1. Also, for example, the first selector SEL1 switches the second source amplifier So2 to the state of being electrically connected to the seventh signal line SL7. The second source amplifier So2 is capable of supplying the image signal to the seventh signal line SL7. The first source amplifier So1 and the second source amplifier So2 are adjacent to each other. For example, the second source amplifier So2 is the source amplifier So of the multiple source amplifiers So that is most proximal to the first source amplifier So1.

Thus, in the display device 115, the source amplifiers So that are disposed to be adjacent to each other supply signals having mutually-different polarities in one frame. Thereby, the design of the circuits such as the drive circuit 62, etc., is easy.

Figure 15:
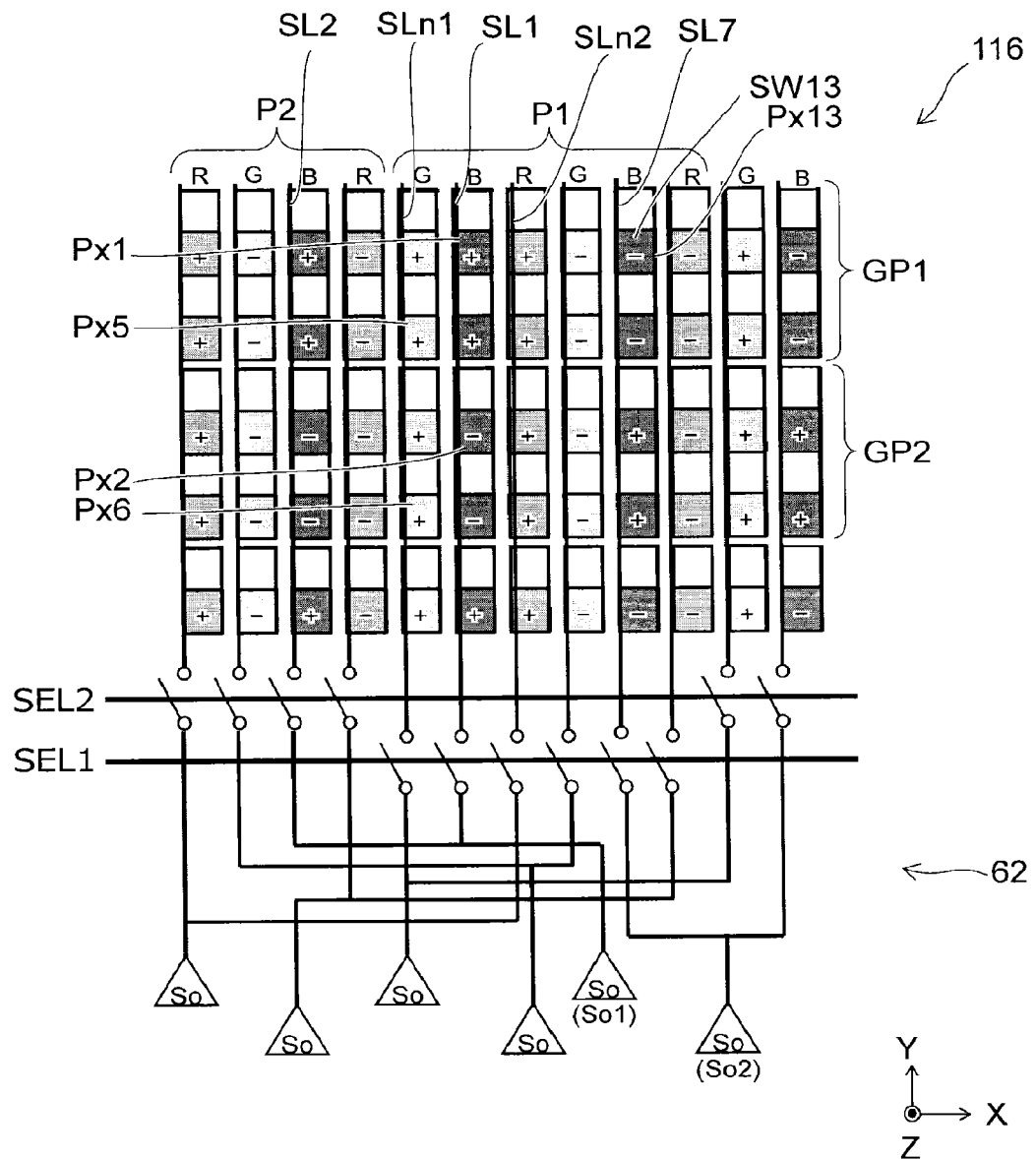
FIG. 15 is a schematic view showing the display device according to the third embodiment.

FIG. 15 is a schematic view showing the display device according to the third embodiment.

FIG. 15 shows a display device 116. In the display device 116 as well, the multiple signal lines SL include the first portion P1 and the second portion P2. The drive circuit 62 includes the first selector SEL1, the second selector SEL2, the multiple source amplifiers So, etc. The connections between the first selector SEL1 and the multiple source amplifiers So of the display device 116 are different from those of the display device 115. Otherwise, a configuration similar to the configuration described in regard to the display device 115 is applicable to the display device 116.

In the display device 116 as well, the source amplifiers So that are disposed to be adjacent to each other supply signals having mutually-different polarities for one frame. Thereby, the design of the circuits such as the drive circuit 62, etc., is easy. For example, the image signals are supplied simultaneously to the first signal line SL1 and to the signal line adjacent to the first signal line SL1. Thereby, for example, the nonuniformity of the display can be suppressed.

Figure 16:
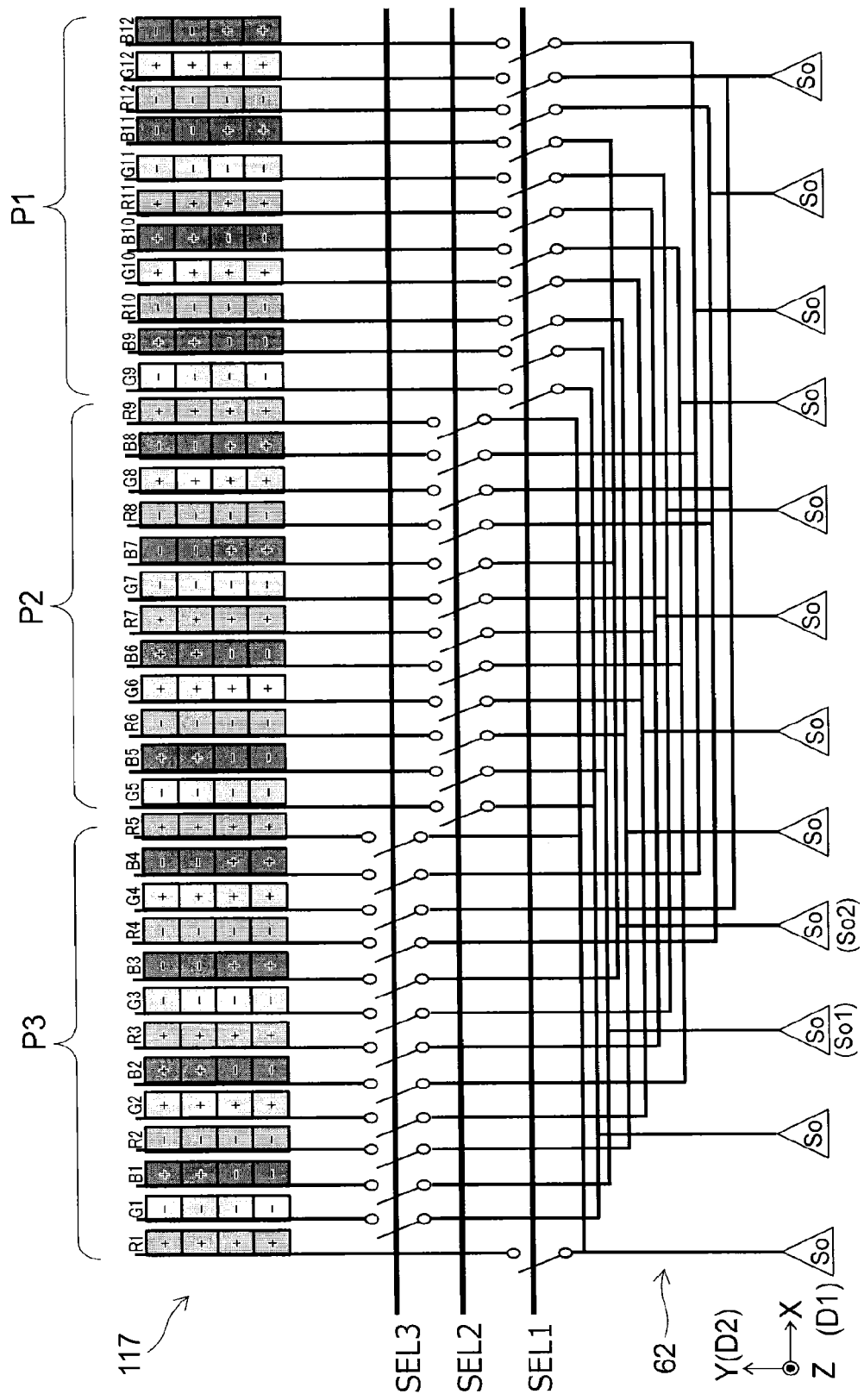
FIG. 16 is a schematic view showing the display device according to the third embodiment.

FIG. 16 is a schematic view showing the display device according to the third embodiment.

FIG. 16 shows a display device 117. In the display device 117 as well, the multiple signal lines SL include the first portion P1 and the second portion P2. The drive circuit 62 includes the first selector SEL1, the second selector SEL2, the multiple source amplifiers So, etc.

In the display device 117, the multiple signal lines SL include a third portion P3. The third portion P3 is a portion of the multiple signal lines SL other than the first portion P1 and the second portion P2. The drive circuit 62 further includes a third selector SEL3.

The third selector SEL3 is electrically connected to each of the multiple signal lines SL included in the third portion P3. Each of the multiple source amplifiers So is electrically connected to the third selector SEL3.

The first display interval DT1 further includes a third interval T3. For example, the third interval T3 is the interval after the second interval T2.

In the third interval T3, the third selector SEL3 electrically connects the multiple source amplifiers So respectively to the multiple signal lines SL included in the third portion P3. Thereby, in the third interval T3, the multiple source amplifiers So respectively supply the image signals to the multiple signal lines SL included in the third portion P3. Otherwise, a configuration similar to the configuration described in regard to the display device 115 is applicable to the configuration of the display device 117.

Otherwise, in the display device 117 as well, the source amplifiers So that are disposed to be adjacent to each other supply signals having mutually-different polarities for one frame. For example, the image signals are supplied simultaneously to the first signal line SL1 and to the signal line adjacent to the first signal line SL1. Thereby, for example, the nonuniformity of the display can be suppressed.

Fourth Embodiment

Figure 17:
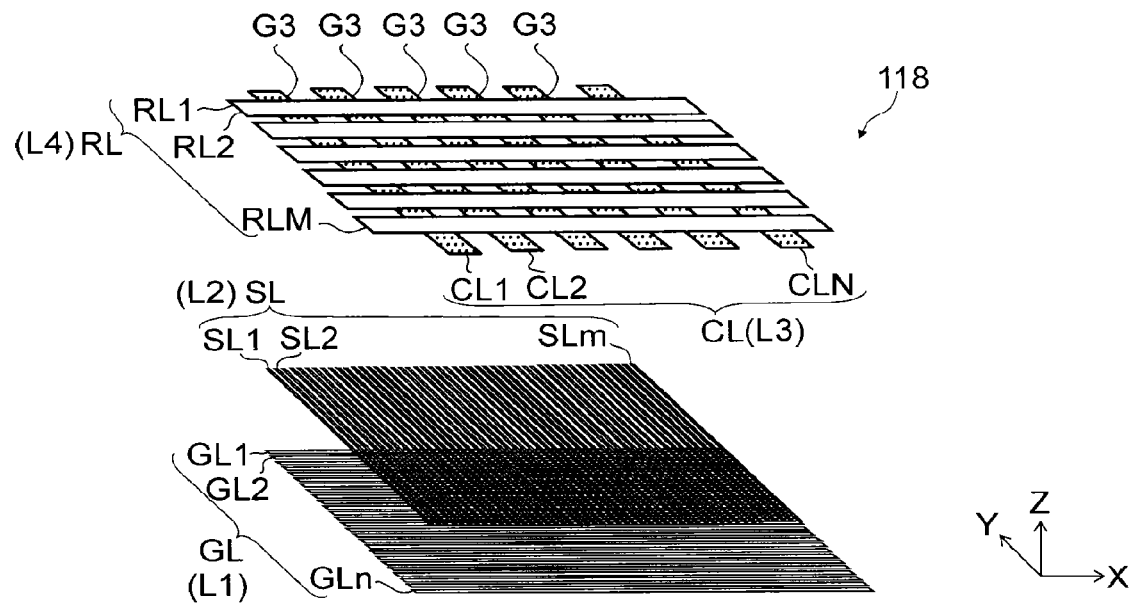
FIG. 17 is a schematic view showing a display device according to a fourth embodiment.

FIG. 17 is a schematic view showing a display device according to a fourth embodiment.

FIG. 17 is a schematic perspective view showing the display device according to the fourth embodiment.

As shown in FIG. 17, the multiple first interconnects L1 (the gate lines GL), the multiple second interconnects L2 (the signal lines SL), and the electrode layer EL (the common electrode CL) are provided in the display device 118 according to the embodiment as well.

The display device 118 further includes multiple fourth interconnects L4 (e.g., sense lines RL). In the display device 117, the common electrode CL may be considered to be the multiple third interconnects L3 (the common lines) that extend in the Y-axis direction and are arranged in the X-axis direction. Otherwise, the configuration of the display device 117 is similar to the configurations described in regard to the display devices according to the first to third embodiments.

The multiple openings G3 are provided in the common electrode CL. The multiple openings G3 extend in the Y-axis direction and are separated from each other in the X-axis direction. The common electrode CL is subdivided by the multiple openings G3 into multiple portions that are separated from each other. The subdivided multiple portions extend in the Y-axis direction and are separated from each other in the X-axis direction. In other words, the subdivided multiple portions may be considered to be the multiple third interconnects L3.

The multiple sense lines RL are separated from the first to third interconnects L1 to L3 in a direction (the Z-axis direction) perpendicular to the X-Y plane. Each of the multiple sense lines RL extends in the X-axis direction. The multiple sense lines RL are arranged in the Y-axis direction.

The multiple third interconnects L3 include, for example, a first common line CL1, a second common line CL2, and an Nth common line CLN. The number of third interconnects L3 is N. N is an integer not less than 2. In the embodiment, N is arbitrary.

The multiple sense lines RL include, for example, a first sense line RL1, a second sense line RL2, and an Mth sense line RLM. The number of sense lines RL is M. M is an integer not less than 2. In the embodiment, M is arbitrary.

In the example, the signal lines SL and the third interconnects L3 are disposed between the gate lines GL and the sense lines RL. In the embodiment, various modifications are possible for the arrangement (in the Z-axis direction) of these lines.

For example, an input (e.g., a touch input) is performed using the multiple third interconnects L3 and the multiple sense lines RL.

For example, the multiple sense lines RL are provided between the second substrate 20 and the second polarizing layer 52. The touch input to the upper surface Uf of the display device 110 is sensed by the multiple sense lines RL and the multiple third interconnects L3.

The sense lines RL are, for example, light-transmissive. The sense lines RL include an oxide (e.g., ITO, etc.) including at least one element selected from the group consisting of In, Sn, Zn, and Ti, etc. A thin metal layer that is light-transmissive may be used as the sense lines RL.

For example, a sense circuit 65 may be further provided in the controller 60. The sense circuit 65 is electrically connected to the sense lines RL. In the sense operation, for example, the capacitance that is created between each of the multiple third interconnects L3 and each of the multiple sense lines RL is sensed by the second drive circuit 62 and the sense circuit 65. The third interconnects L3 may be used as a counter electrode for the sensing while being used as a counter electrode for the display.

For example, the touch input to the display device 118 is sensed by the multiple sense lines RL and the multiple third interconnects L3. For example, in the sense operation, an input member (e.g., an input pen, etc.), a finger of a viewer (the user) of the display device 118, etc., is in contact with or proximal to the display device 118. The electrical capacitance that is created by the sense lines RL and the third interconnects L3 (the common electrode CL) changes due to the contact or proximity recited above. The touch input is sensed by sensing the change of the electrical capacitance. For example, electrostatic-capacitance type sensing is performed. The display device 110 is, for example, a display device that has an input function.

For example, the display device 118 can perform the sense operation OPT in the non-display interval NDT between the first display interval DT1 and the second display interval DT2. In the sense operation OPT, for example, the controller 60 supplies an alternating current signal as a sense signal TSVCOM. For the alternating current signal, a high voltage and a low voltage having an absolute value less than the absolute value of the high voltage are repeated. The touch sensing is performed by this signal and the signals of the sense lines RL. In other words, in the sense operation OPT, the controller 60 senses the current flowing between at least one of the multiple sense lines RL and at least one of the multiple third interconnects L3. For example, the controller 60 senses the change of the current based on the change of the capacitance between the at least one of the multiple sense lines RL and the at least one of the multiple third interconnects L3 due to an object (a viewer, a user, an operator, etc.) proximal to the at least one of the multiple sense lines RL. In the sense operation OPT, the source signal SS is, for example, a ground potential GND.

Thus, in the display device having the input function as well, the openings G3 that correspond to the positions of the signal lines are provided in the common electrode CL. In such a case as well, the nonuniformity of the display can be suppressed by a method similar to the method for driving the pixel electrodes described in regard to the first to third embodiments.

Fifth Embodiment

Figure 18:
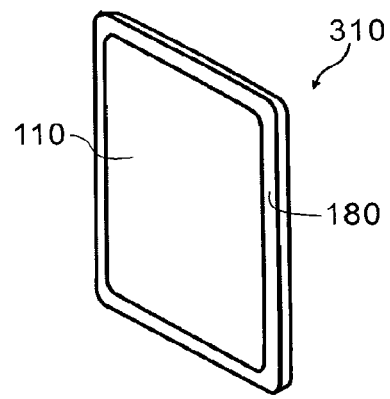
FIG. 18 is a schematic perspective view showing an electronic device according to a fifth embodiment.

FIG. 18 is a schematic perspective view showing an electronic device according to a fifth embodiment.

As shown in FIG. 18, the electronic device 310 according to the embodiment includes the display device 110. The display devices and the modifications of the display devices described in regard to the first and second embodiments may be used as the display device. In the example, the electronic device 310 further includes a housing 180 having an interior in which the display device 110 is contained. For example, a mobile telephone, a personal digital assistant, a personal computer, various information devices, etc., are used as the electronic device 310.

In the electronic device 310 according to the embodiment, a high-quality display can be provided by using the display devices according to the first to fourth embodiments.

According to the embodiments, a high-quality display device and an electronic device can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components included in the display devices such as the interconnects, the switch elements, the display layer, the insulating layer, the controller, the selectors and the circuit, and the housing included in the electronic device, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all display devices and the electronic devices practicable by an appropriate design modification by one skilled in the art based on the display devices and the electronic devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A display device, comprising:
   a plurality of first interconnects;
   a plurality of second interconnects;
   a plurality of switch elements, each of the switch elements being electrically connected to one of the first interconnects and one of the second interconnects;
   a plurality of pixel electrodes electrically connected respectively to the switch elements;
   an electrode layer aligned with a plane having a plurality of openings;
   a display layer performing an optical operation based on an electrical signal applied to the pixel electrodes;
   a plurality of first color filters of a first color; and
   a controller electrically connected to the first interconnects, the second interconnects, and the electrode layer,
   the first interconnects including:
      a first group including a portion of the first interconnects; and
      a second group including another portion of the first interconnects and being adjacent to the first group,
   the pixel electrodes including a plurality of first color electrodes, each of the first color electrodes and one of the first color filters overlapping when projected onto the plane,
   the second interconnects including a plurality of first color interconnects,
   the first color interconnects including:
      a first signal line; and
      a second signal line of the first color interconnects most proximal to the first signal line,
   the switch elements including:
      a plurality of first switches electrically connected respectively to the first interconnects included in the first group, each of the first switches being electrically connected to the first signal line;
      a plurality of second switches electrically connected respectively to the first interconnects included in the second group, each of the second switches being electrically connected to the first signal line;
      a plurality of third switches electrically connected respectively to the first interconnects included in the first group, each of the third switches being electrically connected to the second signal line; and
      a plurality of fourth switches electrically connected respectively to the first interconnects included in the second group, each of the fourth switches being electrically connected to the second signal line,
   the first color electrodes including:
      a plurality of first pixel electrodes electrically connected respectively to the first switches;
      a plurality of second pixel electrodes electrically connected respectively to the second switches;
      a plurality of third pixel electrodes electrically connected respectively to the third switches; and
      a plurality of fourth pixel electrodes electrically connected respectively to the fourth switches,
   at least a portion of the openings and at least a portion of the first signal line overlapping when projected onto the plane,
   the fourth pixel electrodes, the third pixel electrodes, the second pixel electrodes, the first pixel electrodes, and at least a portion of the electrode layer overlapping when projected onto the plane,
   the controller performing, in a first display interval, a first operation of sequentially selecting the first interconnects included in the first group, supplying a first image signal to the first signal line, and supplying a third image signal to the second signal line, the first image signal having a first polarity having the electrode layer as a reference, the third image signal having the first polarity having the electrode layer as the reference,
   the controller performing, in a second display interval after the first display interval, a second operation of sequentially selecting the first interconnects included in the second group, supplying a second image signal to the first signal line, and supplying a fourth image signal to the second signal line, the second image signal having a second polarity having the electrode layer as the reference, the second polarity being the reverse of the first polarity, the fourth image signal having the second polarity having the electrode layer as the reference.

2. The device according to claim 1, further comprising a plurality of second color filters of a second color different from the first color, the pixel electrodes further including a plurality of second color electrodes overlapping one of the second color filters when projected onto the plane, the second interconnects further including a plurality of second color interconnects, the second color interconnects including:
   a third signal line of the second interconnects most proximal to the first signal line; and
   a fourth signal line of the second interconnects most proximal to the second signal line, the switch elements further including:
   a plurality of fifth switches electrically connected respectively to the first interconnects included in the first group, each of the fifth switches being electrically connected to the third signal line;
   a plurality of sixth switches electrically connected respectively to the first interconnects included in the second group, the sixth switches being electrically connected to the third signal line;
   a plurality of seventh switches electrically connected respectively to the first interconnects included in the first group, each of the seventh switches being electrically connected to the fourth signal line; and
   a plurality of eighth switches electrically connected respectively to the first interconnects included in the second group, each of the eighth switches being electrically connected to the fourth signal line, the second color electrodes including:
   a plurality of fifth pixel electrodes electrically connected respectively to the fifth switches;
   a plurality of sixth pixel electrodes electrically connected respectively to the sixth switches;
   a plurality of seventh pixel electrodes electrically connected respectively to the seventh switches; and
   a plurality of eighth pixel electrodes electrically connected respectively to the eighth switches, the eighth pixel electrodes, the seventh pixel electrodes, the sixth pixel electrodes, the fifth pixel electrodes, and a portion of the electrode layer overlapping when projected onto the plane, the first operation including, in the first display interval, an operation of sequentially selecting the first interconnects included in the first group, supplying a fifth image signal to the third signal line, and supplying a seventh image signal to the fourth signal line, the fifth image signal having the first polarity having the electrode layer as the reference, the seventh image signal having the second polarity having the electrode layer as the reference, the second operation including, in the second display interval, an operation of sequentially selecting the first interconnects included in the second group, supplying a sixth image signal to the third signal line, and supplying an eighth image signal to the fourth signal line, the sixth image signal having the first polarity having the electrode layer as the reference, the eighth image signal having the second polarity having the electrode layer as the reference.

3. The device according to claim 2, further comprising a plurality of third color filters of a third color different from the first color and the second color,
   the pixel electrodes further including a plurality of third color electrodes overlapping the third color filters when projected onto the plane,
   the second interconnects including a plurality of third color interconnects, the third color interconnects including a fifth signal line provided between the first signal line and the second signal line, the switch elements further including a plurality of ninth switches electrically connected respectively to the first interconnects included in the first group, each of the ninth switches being electrically connected to the fifth signal line, the third color electrodes including a plurality of ninth pixel electrodes electrically connected respectively to the ninth switches.

4. The device according to claim 3, further comprising a plurality of fourth color filters of a fourth color different from the first color, the second color, and the third color.

5. The device according to claim 4, wherein
the pixel electrodes further includes a plurality of fourth color electrodes overlapping one of the fourth color filters when projected onto the plane,
the second interconnects further includes fourth color interconnects,
the fourth color interconnects includes a sixth signal line provided between the first signal line and the second signal line,
the switch elements further includes a plurality of eleventh switches electrically connected respectively to the first interconnects included in the first group, each of the eleventh switches being electrically connected to the sixth signal line, and
the fourth color electrodes further includes a plurality of eleventh pixel electrodes electrically connected respectively to the eleventh switches.

6. The device according to claim 1, wherein
the second interconnects includes a first portion including:
   the first signal line;
   a first adjacent line adjacent to the first signal line; and
   a second adjacent line adjacent to the first signal line,
the first signal line is provided between the first adjacent line and the second adjacent line,
the controller includes a drive circuit including:
   a first selector electrically connected to the second interconnects; and
   a plurality of source amplifiers, each of the source amplifiers being electrically connected to the first selector,
the first selector electrically connects, in a first interval of the first display interval, the source amplifiers respectively to the second interconnects included in the first portion, and
the controller, in the first interval, supplies the first image signal to the first signal line, supplies an image signal different from the first image signal to the first adjacent line, and supplies one other image signal different from the first image signal to the second adjacent line.

7. The device according to claim 6, wherein
the first color interconnects further includes a seventh signal line separated from the first signal line,
the switch elements further includes a plurality of thirteenth switches electrically connected respectively to the first interconnects included in the first group, each of the thirteenth switches being electrically connected to the seventh signal line,
the first color electrodes further includes a plurality of thirteenth pixel electrodes electrically connected respectively to the thirteenth switches,
the first operation includes, in the first display interval, an operation of sequentially selecting the first interconnects included in the first group and supplying a thirteenth image signal having the second polarity to the seventh signal line, the source amplifiers includes:
- a first source amplifier electrically connected to the first signal line; and
- a second source amplifier electrically connected to the seventh signal line, and the first source amplifier and the second source amplifier are adjacent to each other.

8. The device according to claim 1, wherein
the openings extend in a second direction and are separated from each other in a first direction, and
the electrode layer includes a plurality of third interconnects extending in the second direction and being separated from each other in the first direction.

9. The device according to claim 8, further comprising a plurality of fourth interconnects separated from the third interconnects in a direction perpendicular to the plane,
the fourth interconnects extending in the first direction and being arranged in the second direction.

10. The device according to claim 9, wherein the controller senses, in a non-display interval between the first display interval and the second display interval, a current flowing between at least one of the fourth interconnects and at least one of the third interconnects.

11. The device according to claim 10, wherein the controller senses a change of the current based on a change of a capacitance between the at least one of the fourth interconnects and the at least one of the third interconnects due to an object proximal to the at least one of the fourth interconnects.

12. The device according to claim 1, wherein the first color is blue.

13. The device according to claim 1, further comprising a plurality of supplemental interconnects,
each of the supplemental interconnects being electrically connected to the electrode layer,
an electrical resistance of each of the supplemental interconnects being lower than an electrical resistance of the electrode layer.

14. An electronic device comprising the display device according to claim 1.

15. A display device, comprising:
a plurality of first interconnects;
a plurality of second interconnects;
a plurality of switch elements, each of the switch elements being electrically connected to one of the first interconnects and one of the second interconnects;
a plurality of pixel electrodes electrically connected respectively to the switch elements;
an electrode layer aligned with a plane having a plurality of openings;
a display layer performing an optical operation based on an electrical signal applied to the pixel electrodes;
a plurality of first color filters of a first color; and
a controller electrically connected to the first interconnects, the second interconnects, and the electrode layer,
the first interconnects including:
- a first group including a portion of the first interconnects; and
- a second group including another portion of the first interconnects and being adjacent to the first group,
the pixel electrodes including a plurality of first color electrodes, each of the first color electrodes and one of the first color filters overlapping when projected onto the plane, the second interconnects including a plurality of first color interconnects,
the first color interconnects including a first signal line,
the switch elements including:
- a plurality of first switches electrically connected respectively to the first interconnects included in the first group, each of the first switches being electrically connected to the first signal line; and
- a plurality of second switches electrically connected respectively to the first interconnects included in the second group, each of the second switches being electrically connected to the first signal line, the first color electrodes including:
- a plurality of first pixel electrodes electrically connected respectively to the first switches; and
- a plurality of second pixel electrodes electrically connected respectively to the second switches, at least a portion of the openings and at least a portion of the first signal line overlapping when projected onto the plane,
the second pixel electrodes, the first pixel electrodes, and at least a portion of the electrode layer overlapping when projected onto the plane,
the controller performing, in a first display interval of an interval of displaying a first frame, a first operation of sequentially selecting the first interconnects included in the first group and supplying a first signal to the first signal line, the first signal having a first polarity having the electrode layer as a reference,
the controller performing, in a second display interval of the interval of displaying the first frame, a second operation of sequentially selecting the first interconnects included in the second group and supplying a second signal to the first signal line, the second display interval being after the first display interval, the second signal having a second polarity having the electrode layer as the reference, the second polarity being the reverse of the first polarity,
the controller performing, in a third display interval of an interval of displaying a second frame, a third operation of sequentially selecting the first interconnects included in the first group and supplying a third signal to the first signal line, the second frame being the next frame after the first frame, the third signal having the first polarity having the electrode layer as the reference,
the controller performing, in a fourth display interval of the interval of displaying the second frame, a fourth operation of sequentially selecting the first interconnects included in the second group and supplying a fourth signal to the first signal line, the fourth display interval being after the third display interval, the fourth signal having the second polarity having the electrode layer as the reference.

16. The device according to claim 15, further comprising a plurality of second color filters of a second color different from the first color,
the pixel electrodes further including a plurality of second color electrodes overlapping one of the second color filters when projected onto the plane,
the second interconnects further including a plurality of second color interconnects,
the second color interconnects including a third signal line of the second interconnects most proximal to the first signal line,
the switch elements further including:
- a plurality of fifth switches electrically connected respectively to the first interconnects included in the first group, each of the fifth switches being electrically connected to the third signal line; and a plurality of sixth switches electrically connected respectively to the first interconnects included in the second group, each of the sixth switches being electrically connected to the third signal line, the second color electrodes including:

a plurality of fifth pixel electrodes electrically connected respectively to the fifth switches; and a plurality of sixth pixel electrodes electrically connected respectively to the sixth switches, the sixth pixel electrodes, the fifth pixel electrodes, and a portion of the electrode layer overlapping when projected onto the plane, the first operation further including, in the first display interval, an operation of sequentially selecting the first interconnects included in the first group and supplying a fifth signal to the third signal line, the fifth signal having the first polarity having the electrode layer as the reference, the second operation further including, in the second display interval, an operation of sequentially selecting the first interconnects included in the second group and supplying a sixth signal to the third signal line, the sixth signal having the first polarity having the electrode layer as the reference, the third operation further including, in the third display interval, an operation of sequentially selecting the first interconnects included in the first group and supplying a seventh signal to the third signal line, the seventh signal having the second polarity having the electrode layer as the reference, the fourth operation further including, in the fourth display interval, an operation of sequentially selecting the first interconnects included in the second group and supplying an eighth signal to the third signal line, the eighth signal having the second polarity having the electrode layer as the reference.

17. The display device according to claim 15, wherein the first interconnects further includes a third group including one other portion of the first interconnects other than the portion of the first interconnects included in the first group and the portion of the first interconnects included in the second group, the switch elements further includes a plurality of twelfth switches electrically connected respectively to the first interconnects included in the third group, each of the twelfth switches being electrically connected to the first signal line, the first color electrodes further includes a plurality of twelfth pixel electrodes electrically connected respectively to the twelfth switches, the twelfth pixel electrodes and a portion of the electrode layer overlap when projected onto the plane, the controller further performs, in a fifth display interval of the interval of displaying the first frame, a fifth operation of sequentially selecting the first interconnects included in the third group and supplying a ninth signal to the first signal line, the fifth display interval being different from the first display interval and the second display interval, the ninth signal having the second polarity having the electrode layer as the reference, and the controller further performs, in a sixth display interval of the interval of displaying the second frame, a sixth operation of sequentially selecting the first interconnects included in the third group and supplying a tenth signal to the first signal line, the sixth display interval being different from the third display interval and the fourth display interval, the tenth signal having the first polarity having the electrode layer as the reference.

* * * * *